(12) United States Patent
Kim et al.

(10) Patent No.: US 10,660,108 B2
(45) Date of Patent: May 19, 2020

(54) METHOD AND APPARATUS FOR EFFICIENTLY TRANSMITTING INFORMATION ACQUIRED BY A TERMINAL TO A BASE STATION

(75) Inventors: Sang Bum Kim, Suwon-si (KR); Soeng Hun Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 536 days.

(21) Appl. No.: 14/110,515

(22) PCT Filed: Apr. 10, 2012

(86) PCT No.: PCT/KR2012/002730
§ 371 (c)(1),
(2), (4) Date: Oct. 8, 2013

(87) PCT Pub. No.: WO2012/141483
PCT Pub. Date: Oct. 18, 2012

(65) Prior Publication Data
US 2014/0023032 A1    Jan. 23, 2014

Related U.S. Application Data

(60) Provisional application No. 61/473,966, filed on Apr. 11, 2011, provisional application No. 61/484,645, filed on May 10, 2011.

(30) Foreign Application Priority Data

Apr. 10, 2012  (KR) .................... 10-2012-0037248

(51) Int. Cl.
*H04W 72/08* (2009.01)
*H04W 74/08* (2009.01)
*H04W 76/18* (2018.01)

(52) U.S. Cl.
CPC ..... *H04W 72/085* (2013.01); *H04W 74/0833* (2013.01); *H04W 76/18* (2018.02)

(58) Field of Classification Search
USPC ........................................... 370/329
See application file for complete search history.

(56) References Cited

U.S. PATENT DOCUMENTS 6,829,227 B1    12/2004 Pitt et al.
8,571,542 B2 *  10/2013 Wu ............... H04W 24/10
                                                370/241

(Continued)

FOREIGN PATENT DOCUMENTS

CN    101998646 A    3/2001
CN    201550284 U    8/2010

(Continued)

OTHER PUBLICATIONS

3GPP TS 36.331, 3rd Generation Partnership Project; Technical Specification Group Radio Access Network; Evolved Universal Terrestrial Radio Access (E-UTRA); Radio Resource Control (RRC); Protocol specification (Release 10), V10.1.0, Mar. 2011.

(Continued)

*Primary Examiner* — Alpus Hsu
*Assistant Examiner* — Hooman Houshmand
(74) *Attorney, Agent, or Firm* — Jefferson IP Law, LLP

(57) ABSTRACT

A communication method for a terminal is disclosed, including creating a radio link failure (rlf)-report including information associated with an rlf with a first base station; connecting to one base station from among base stations including the first base station; and transmitting the rlf-report to the one base station. Furthermore, a communication method for a base station is also disclosed, including connecting to the terminal; and receiving an rlf-report including information associated with a previous rlf between (Continued)

the terminal and another base station. In an aspect, information including channel information is transmitted to a base station to which a terminal is initially connected even when the terminal has failed in performing random access thereto, to thus enable the efficient transmission of information, and the base station may control scheduling or the like in accordance with the information reported by the terminal, thereby enabling efficient communication.

17 Claims, 17 Drawing Sheets

(56) References Cited

U.S. PATENT DOCUMENTS

| | | | |
|---|---|---|---|
| 10,070,355 B2* | 9/2018 | Sebire | H04W 36/0083 |
| 10,349,348 B2 | 7/2019 | Yi et al. | |
| 2004/0229626 A1 | 11/2004 | Yi et al. | |
| 2005/0176474 A1 | 8/2005 | Lee et al. | |
| 2006/0258386 A1 | 11/2006 | Jeong et al. | |
| 2008/0031128 A1 | 2/2008 | Jang et al. | |
| 2008/0102749 A1 | 5/2008 | Becker | |
| 2008/0228654 A1 | 9/2008 | Edge | |
| 2009/0093280 A1 | 4/2009 | Kitazoe | |
| 2009/0154408 A1 | 6/2009 | Jeong et al. | |
| 2009/0221289 A1 | 9/2009 | Xu et al. | |
| 2009/0232118 A1 | 9/2009 | Wang et al. | |
| 2009/0238098 A1 | 9/2009 | Cai et al. | |
| 2009/0238117 A1 | 9/2009 | Somasundaram et al. | |
| 2009/0257353 A1* | 10/2009 | Song | H04W 24/02 370/241 |
| 2010/0110897 A1 | 5/2010 | Chun et al. | |
| 2010/0113019 A1 | 5/2010 | Jeong et al. | |
| 2010/0118720 A1 | 5/2010 | Gauvreau et al. | |
| 2010/0124173 A1* | 5/2010 | Agashe | H04W 36/0083 370/245 |
| 2010/0135159 A1 | 6/2010 | Chun et al. | |
| 2010/0135208 A1 | 6/2010 | Ishii et al. | |
| 2010/0144299 A1 | 7/2010 | Ren | |
| 2010/0190488 A1* | 7/2010 | Jung | H04W 24/10 455/424 |
| 2010/0208707 A1* | 8/2010 | Hamabe | H04W 24/10 370/332 |
| 2010/0254351 A1 | 10/2010 | Wang et al. | |
| 2010/0265867 A1 | 10/2010 | Becker et al. | |
| 2010/0272086 A1 | 10/2010 | Jung et al. | |
| 2010/0273515 A1 | 10/2010 | Fabien et al. | |
| 2011/0021201 A1 | 1/2011 | Lee et al. | |
| 2011/0170418 A1* | 7/2011 | Sagfors | H04W 36/0083 370/241 |
| 2011/0183662 A1* | 7/2011 | Lee | H04W 24/10 455/422.1 |
| 2011/0194441 A1* | 8/2011 | Jung | H04W 76/046 370/252 |
| 2011/0201279 A1* | 8/2011 | Suzuki | H04W 24/10 455/67.11 |
| 2011/0242969 A1* | 10/2011 | Dayal | H04W 36/0055 370/225 |
| 2011/0249635 A1 | 10/2011 | Chen et al. | |
| 2011/0250880 A1* | 10/2011 | Olsson | H04W 76/027 455/423 |
| 2011/0286356 A1* | 11/2011 | Tenny | H04W 24/10 370/254 |
| 2011/0310818 A1* | 12/2011 | Lin | H04W 72/042 370/329 |
| 2012/0039365 A1* | 2/2012 | Suzuki | G01S 19/05 375/147 |
| 2012/0040620 A1* | 2/2012 | Fu | H04B 1/1027 455/63.1 |
| 2012/0057490 A1 | 3/2012 | Park et al. | |
| 2012/0069766 A1* | 3/2012 | Fu | H04B 1/406 370/252 |
| 2012/0108199 A1* | 5/2012 | Wang | H04W 24/10 455/405 |
| 2012/0140743 A1* | 6/2012 | Pelletier | H04W 72/0453 370/335 |
| 2012/0147830 A1 | 6/2012 | Löhr et al. | |
| 2012/0176924 A1* | 7/2012 | Wu | H04W 72/0406 370/252 |
| 2012/0202557 A1* | 8/2012 | Olofsson | H04W 24/08 455/525 |
| 2012/0207040 A1* | 8/2012 | Comsa | H04W 72/1215 370/252 |
| 2012/0213096 A1* | 8/2012 | Krishnamurthy | H04L 5/001 370/252 |
| 2012/0213162 A1* | 8/2012 | Koo | H04W 16/14 370/329 |
| 2012/0276936 A1* | 11/2012 | Ahn | H04W 76/19 455/501 |
| 2012/0281548 A1* | 11/2012 | Lin | H04W 36/30 370/242 |
| 2012/0307811 A1* | 12/2012 | Kwon | H04W 74/0833 370/336 |
| 2012/0307821 A1 | 12/2012 | Kwon et al. | |
| 2012/0309404 A1* | 12/2012 | Suzuki | H04W 24/10 455/450 |
| 2013/0003692 A1* | 1/2013 | Nishio | H04L 5/001 370/329 |
| 2013/0178204 A1* | 7/2013 | Zhang | H04W 36/0083 455/423 |
| 2014/0023030 A1* | 1/2014 | Jeong | H04L 5/001 370/329 |

FOREIGN PATENT DOCUMENTS

| | | |
|---|---|---|
| CN | 102204386 A | 9/2011 |
| EP | 1 636 922 B1 | 3/2008 |
| EP | 1973355 A1 | 9/2008 |
| EP | 1 865 630 B1 | 3/2009 |
| EP | 2180736 A1 | 4/2010 |
| EP | 2 265 077 A1 | 12/2010 |
| EP | 2375848 A1 | 10/2011 |
| EP | 2536227 A2 | 12/2012 |
| KR | 2004-0098126 A | 11/2004 |
| KR | 10-2006-0099462 A | 9/2006 |
| KR | 10-2008-0012443 A | 2/2008 |
| KR | 10-2009-0038752 A | 4/2009 |
| KR | 10-2009-0086441 A | 8/2009 |
| KR | 10-2009-0104471 A | 10/2009 |
| KR | 10-2009-0122174 A | 11/2009 |
| KR | 10-2010-0050336 A | 5/2010 |
| KR | 10-2010-0104022 A | 9/2010 |
| KR | 10-2010-0108459 A | 10/2010 |
| KR | 10-2010-0126509 A | 12/2010 |
| KR | 10-2011-0011554 A | 2/2011 |
| KR | 1717522 B1 | 3/2017 |
| WO | 2007/004956 A1 | 1/2007 |
| WO | 2008112819 A2 | 9/2008 |
| WO | 2008/119380 A1 | 10/2008 |
| WO | 2008136294 A1 | 11/2008 |
| WO | 2009/154412 A2 | 12/2009 |
| WO | 2010145799 A1 | 12/2010 |
| WO | 2011/039636 A1 | 4/2011 |
| WO | 2011/050564 A1 | 5/2011 |
| WO | 2012/108643 A2 | 8/2012 |

OTHER PUBLICATIONS

Huawei et al., Remaining issues regarding RLF reporting for MDT, 3GPP Draft, R2-111239, 3rd Generation Partnership Project (3GPP), 3GPP TSG-RAN WG2 Meeting #73, Feb. 21-25, 2011, Taipei, Taiwan., Three pages.

"3rd Generation Partnership Project; Technical Specification Group Radio Access Network; Evolved Universal Terrestrial Radio Access (E-UTRA); User Equipment (UE) radio access capabilities (Release 10)", 3GPP Standard; 3GPP TS 36.306, 3rd Generation Partnership Project (3GPP), XP050462122, 34 pages.

3GPP TS 36.304 V10.1.0, 17 pages.

(56) References Cited

OTHER PUBLICATIONS

LG Electronics Inc., Clarification on cell reselection when camping on a CSG cell with dedicated priorities other than the serving frequency, 3GPP TSG-RAN WG2#73bis, R2-112393, 5 pages.
Vodafone: "M2M: Small data transmission using optimised SMS", 3GPP Draft; S2-111826, 3rd Generation Partnership Project (3GPP), Mobile Competence Centre ; 650, Route Des Lucioles ; F-06921 Sophia-Anti Polis Cedex ; France, vol. SA WG2, No. Bratislava; Apr. 11, 2011, XP050524712, 4 pages.
Huawei et al.; Extension to Radio Link Failure reporting for MDT and MRO; 3GPP TSG-RAN WG2 Meeting #72bis; R2-110101; Jan. 17-21, 2011; Ireland, Dublin.
3GPP: 3rd Generation Partnership Project; Technical Specification Group Radio Access Network; Evolved Universal Terrestrial Radio Access (E-UTRA); Physical layer procedures (Release 10), 3GPP Draft; Draft 36.213-A10, 3rd Generation Partnership Project (3GPP), Mobile Competence Centre ; 650, Route Des Lucioles ; F-06921 Sophia-Antipolis Cedex; France, vol. RAN WG1, Mar. 24, 2011, XP050487473.
LG Electronics: Remaining Details on Transmission Mode 9, 3GPP Draft; R1-106322_DL_TM9, 3rd Generation Partnership Project (3GPP), Mobile Competence Centre ; 650, Route Des Lucioles ; F-06921 Sophia-Antipolis Cedex; France, vol. RAN WG1, No. Jacksonville, USA; Nov. 15, 2010, Nov. 10, 2010, XP050489820.
Nokia et al: Remaining details of transmission mode 9 control signaling, 3GPP Draft; R1-106206, 3rd Generation Partnership Project (3GPP), Mobile Competence Centre ; 650, Route Des Lucioles ; F-06921 Sophia-Antipolis Cedex ; France, vol. RAN WG1, No. Jacksonville, USA; Nov. 15, 2010, 9 Nov. 11, 2010, XP050489651.
3GPP TSG RAN WG1 Meeting #63bis R1-110283 Dublin, Ireland, Clarification of Rel-10 UE category and MIMO layer capability definition, Source: Research in Motion UK Limited, Jan. 17-21, 2011.
LG Electronics: Remaining Details on Transmission Mode 9, 3GPP Draft; R1-106322_DL_TM9, 3rd Generation Partnership Project (3GPP), Mobile Competence Centre ; 650, Route Des Lucioles ; F-06921 Sophia-Antipolis Cedex; France, vol. RAN WG1, No. Jacksonville, USA; Nov. 15, 2010, Nov. 11, 2010, XP050468239.
European Search Report dated Jan. 22, 2018 issued in European Application No. 17198131.9-1219.
Korean Office Action dated Apr. 18, 2018, issued in Korean Application No. 10-2011-0141878.
Korean Office Action dated Mar. 28, 2018, issued in Korean Application No. 10-2012-0035969.
Korean Office Action dated Jan. 22, 2018, issued in Korean Application No. 10-2012-0049735.
Korean Office Action dated Mar. 13, 2018, issued in Korean Application No. 10-2012-0049772.
Nokia, Nokia Siemens Networks, "Considerations on release 10 UE categories", 3GPP TSG-RAN WG4#57 R4-104313, Nov. 9, 2010, pp. 1-4.
HTC, "Clarification on UE capability", 3GPP TSG-RAN WG2#72bis R2-110059, Jan. 11, 2011, pp. 1-6.
NTT DOCOMO, "Soft Buffer Partitioning and Rate Matching for DownlinkCA", 3GPP TSG-RAN WG1#63bis R1-110555, Jan. 21, 2011, pp. 1-10.
Ericsson, ST-Ericsson, "On Rel-10 UE capabilities", 3GPP TSG-RAN WG1#63bis R1-110514, Jan. 21, 2011, pp. 1-6.
3GPP TS 36321 V10.1.0, 3rd Generation Partnership Project; Technical Specification Group Radio Access Network; Evolved Universal Terrestrial Radio Access (E-UTRA); Medium Access Control (MAC) protocol specification (Release 10).
3GPP TSG-RAN2 Meeting #50, R2-060082, Sophia Antipolis, France, Jan. 9-13, 2006.
Pantech, "Discussion on ICO handover", 3GPP TSG-RAN WG2 Meeting #73bis, R2-112268, Apr. 5, 2011. http://www.3gpp.org/flp/tsg_ran /WG2_RL2/TSGR2_73bis/Docs/ >.

Huawei et al. "Extension to Radio Link Failure reporting for MDT and MRO", 3GPP TSG-RAN WG2 Meeting #72bis, R2-110101, Jan. 10, 2011. < http://www.3gpp.org/ftp/tsg_ran /WG2_RL2/TSGR2_72bis/Docs/ >.
Japanese Office Action dated Jun. 11, 2018, issued in Japanese Application No. 2017-160907.
Korean Office Action dated Jun. 15, 2018, issued in the Korean Application No. 9-5-2018-040506561.
Korean Decision on Patent dated Jun. 21, 2018, issued in the Korean Application No. 9-5-2018-042143335.
Korean Office Action dated Aug. 10, 2018, issued in the Korean Application No. 9-5-2018-054595676.
Indian Examination Report dated Jul. 7, 2018, issued in the Indian Application No. 2427/KOLNP/2013.
3GPP TSG RAN WG2 #69 Feb. 22-26, 2010 San Francisco. E-mail rapporteur (NTT DOCOMO Inc.), CA Support for Multi-TA. R2-101567.
3GPP TSG RAN WG2 #70bis. Jun. 28-Jul. 2, 2010 in Stockholm, Sweden. Panasonic, R2-103605, UL activation and details of MAC CE for CC Management.
3GPP TSG RAN WG2 #72bis Dublin, Ireland, Jan. 17-21, 2011. InterDigital Communications, R2-110216, Timing of SCell Activation in LTE CA.
Korean Intellectual Property Office Decision dated Sep. 19, 2018, issued in the Korean Application No. 9-5-2018-064741366.
Korean Intellectual Property Office Action dated Sep. 27, 2018, issued in the Korean Application No. 9-5-2018-065930615.
European Patent Office Action dated Sep. 26, 2018, issued in the European Application No. 12 770 987.1-1219.
Korean Intellectual Property Office Action dated Nov. 9, 2018, issued in the Korean Application No. 9-5-2018-076457127.
Korean Intellectual Property Office Action dated Nov. 9, 2018, issued in the Korean Application No. 9-5-2018-076491013.
Nokia; "R2-083000 ANR email discussion report"; 3GPP TSG-RAN WG2 RRC Adhoc; Sophia Antipolis, France; Jun. 5-6, 2008; XP050607863.
European Office Action dated Mar. 27, 2019; Reference #: P6048287EP1; Application #/Patent#: 19160842.1-1219.
3GPP TS36.321 V10.1.0, 3rd Generation Partnership Project; Technical Specification Group Radio Access Network; Evolved Universal Terrestrial Radio Access (E-UTRA); Medium Access Control (MAC) protocol specification (Release 10) 650 Route des Lucioles—Sophia Antipolis Valbonne—France; Mar. 2011.
Research in Motion, UK Limited; "Supporting Format 1A in MBSFN Subframes for Rel-10 UE"; 3GPP TSG RAN WG1 Meeting #63bis; Jan. 17-21, 2011; Dublin, Ireland; R1-110284.
Samsung; "PDSCH transmission in MBSFN subframes"; 3GPP TSG RAN WG1 #64; Feb. 21-25, 2011; Taipei, Taiwan; R1-110736.
InterDigital Communications, LLC; "Unicast Reuse of MBSFN-reserved Subframes"; 3GPP TSG-RAN WG1 Meeting #58bis; Oct. 12-16, 2009; Miyazaki, Japan; R1-093888.
Ericsson; "Physical-layer parameters to be configured by RRC"; TSG-RAN WG1 #51bis; Jan. 14-18, 2008; Sevilla, Spain; R1-080340.
Ericsson, ST Ericsson; "Multiple TA with a single TAT"; 3GPP TSG-RA WG2 #74; May 9-13, 2010; Barcelona, Spain; R2-112984.
Samsung; "Main issues in supporting multi-TAs"; 3GPP TSG RAN WG2#73BIS; Apr. 11-15, 2011; Shanghai, China; R2-112305.
Alcatel-Lucent, Alcatel-Lucent Shanghai Bell; "Initiating timing alignment for SCell in multiple TA"; TSG-RAN WG2#74; May 9-13, 2011; Barcelona, Spain; R2-113235.
InterDigital Communications; "Support for multiple Timing Advance in LTE CA"; 3GPP TSG-RA WG2 #74; May 9-13, 2011; Barcelona, Spain; R2-113255.
3rd Generation Partnership Project; Technical Specification Group Radio Access Network; Evolved Universal Terrestrial Radio Access (E-UTRA); Radio Resource Control (RRC); Protocol specification (Release 10); 3GPP TS 36.331; 650 Route des Lucioles—Sophia Antipolis Valbonne—France; Mar. 2011.
Huawei, HiSilicon; "Extension to Radio Link Failure reporting for MDT and MRO"; 3GPP TSG-RAN WG2 Meeting #72bis; Jan. 17-21, 2011; Ireland, Dublin; R2-110101.

(56) References Cited

OTHER PUBLICATIONS

Samsung; "Enhancement of FDM solution scope for in-device coexistence"; 3GPP TSG-RAN WG2 #72bis; Jan. 17-21, 2011; Dublin, Ireland; R2-110409.
Korean Intellectual Property Office (KIPO) Notification of a Decision to Grant a Patent dated Dec. 12, 2018; Application: 10-2012-0037390.
Korean Intellectual Property Office (KIPO) an Office Action dated Jan. 25, 2019; Application: 10-2012-0046817.
Korean Intellectual Property Office (KIPO) and an Office Action dated Jan. 29, 2019; Application: 10-2012-0049645.
Korean Intellectual Property Office (KIPO) and an Office Action dated Feb. 1, 2019; Application: 10-2018-0084120.
Indian Examination Report dated Sep. 16, 2019, issued in Indian Application No. 2867/KOLNP/2013.
Indian Examination Report dated Jul. 17, 2019, issued in Indian Application No. 2866/KOLNP/2013.
Korean Office Action dated Jul. 18, 2019, issued in Korean Application No. 10-2012-0035573.
Korean Office Action dated Sep. 18, 2019, issued in Korean Application No. 10-2019-0074183.
Korean Office Action dated Jul. 18, 2019, issued in Korean Application No. 10-2012-0049645.
Chinese Office Action dated Sep. 3, 2019, issued in Chinese Application No. 201610886019.X.
Alcatel-Lucent et al., R2-112210, SCell configuration for multiple TA, 3GPP TSG RAN WG2 #73bis. Apr. 4, 2011. Shanghai, China.
Alcatel-LucentShanghai Bell et al., R2-102372, Discussion on TA timer for LTE-A CA scenario, 3GPP TSG RAN WG2 #69bis. Apr. 5, 2010. Beijing, China.
Panasonic, R2-112819, Time Alignment in case of multiple TA, 3GPP TSG RAN WG2 #74. May 2, 2011. Barcelona, Spain.
ITRI, R2-112201, Considerationson Multiple TAs in CA, 3GPP TSG RAN WG2 #73bis. Apr. 5, 2011. Shanghai, China.
ITRI, R2-113193, Considerations on TAT for Multiple TAs, 3GPP TSG RAN WG2 #74. May 3, 2011. Barcelona, Spain.
"3rd Generation Partnership Project; Technical Specification Group Radio Access Network; Mobility procedures for Home Node B (HNB); Overall description; Stage 2 (Release 10)", 3GPP Standard; 3GPP TS 25.367, 3rd Generation Partnership Project (3GPP), Mobile Competence Centre; 650, Route Des Lucioles; F-06921 Sophia-Anti Polis Cedex; France No. V10.0.0, Mar. 15, 2011 (Mar. 15, 2011), pp. 1-14, XP050476328.
Nokia et al: "E-UTRA Cell Selection and Cell Reselection Aspects", 3GPP Draft; R2-074051 E-UTRA Cell Reselections, 3rd Generation Partnership Project (3GPP), Mobile Competence Centre; 650, Route Des Lucioles; F-06921 Sophia-Antipolis Cedex; France, vol. RAN WG2, No. Shanghai, China; 20071002, Oct. 2, 2007 (Oct. 2, 2007), XP050136685.
Alcatel-Lucent et al., R2-112208, DL reference & the need of TA grouping for multiple TA, 3GPP TSG RAN WG2 #73bis. Apr. 4, 2011. Shanghai, China.
Samsung, R2-105401, Discussionon TAT expiry, 3GPP TSG RAN WG2 #71bis. Oct. 5, 2010. Xian, China.
Extended European Search Report dated Nov. 4, 2019, issued in European Application No. 19196752.0-1219.
Chinese Office Action dated Feb. 6, 2020, issued in Chinese Application No. 201710352071.1.

\* cited by examiner

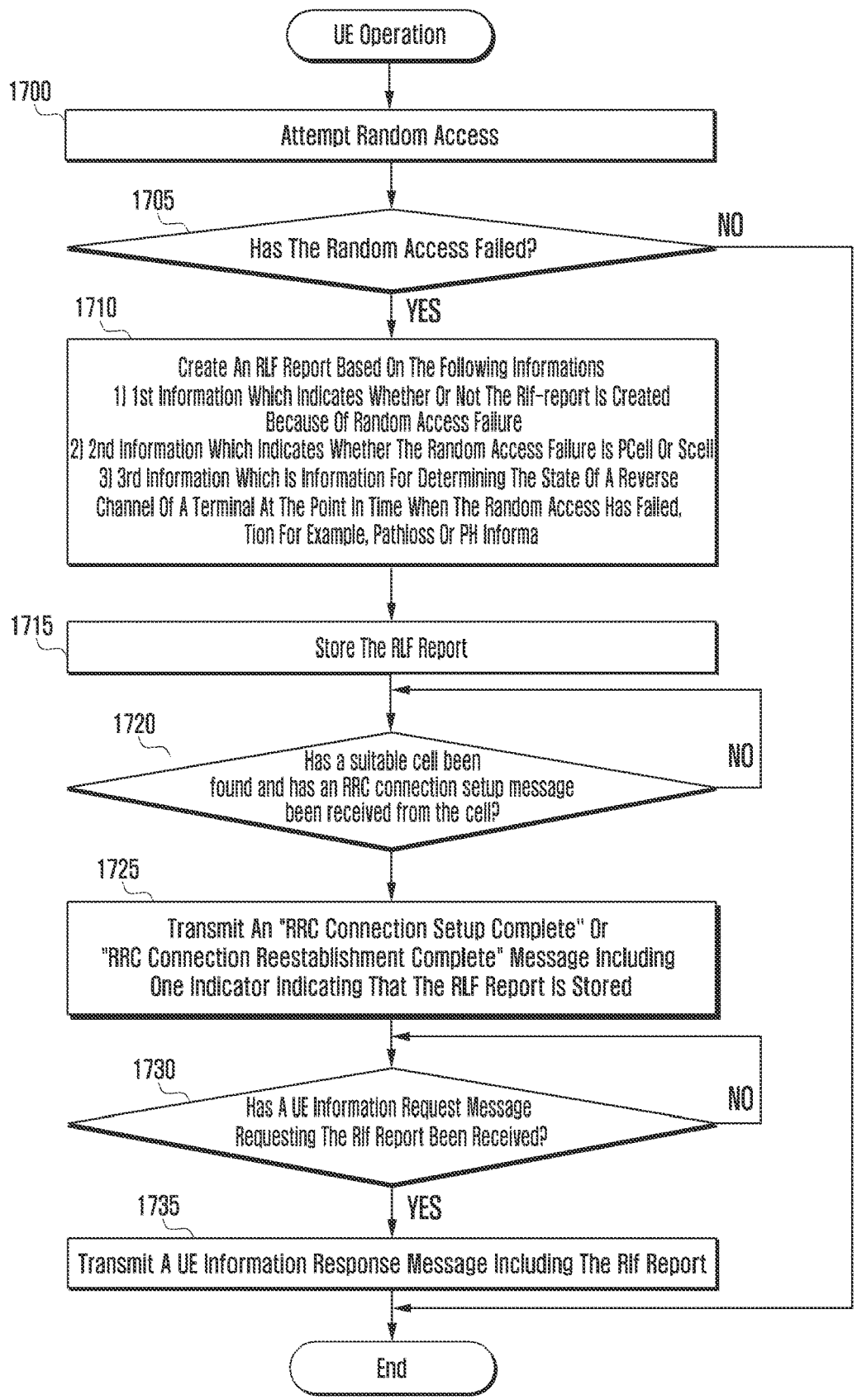

METHOD AND APPARATUS FOR EFFICIENTLY TRANSMITTING INFORMATION ACQUIRED BY A TERMINAL TO A BASE STATION

TECHNICAL FIELD

The present invention relates to a method and apparatus for transmitting information acquired by the terminal to the base station efficiently.

BACKGROUND ART

The mobile communication system has been developed for the user to communicate on the move. With the rapid advance of technologies, the mobile communication system has evolved to the level capable of providing high speed data communication service as well as voice telephony service.

Recently, as one of the next generation mobile communication system, Long Term Evolution (LTE) is on the standardization by the 3$^{rd}$ Generation Partnership Project (3GPP). LTE is a technology designed to provide high speed packet-based communication of up to 100 Mbps and aims at commercial deployment around 2010 timeframe. In order to accomplish the aim, a discussion is being held on several schemes: one scheme for reducing the number of nodes located in a communication path by simplifying a configuration of the network, and another scheme for maximally approximating wireless protocols to wireless channels.

Meanwhile, unlike voice service, the data service is provided on the resource determined according to the data amount to be transmitted and channel condition. Accordingly, the wireless communication system, especially cellular communication, is provided with a scheduler manages transmission resource allocation in consideration of the required resource amount, channel condition, data amount, etc. This is the fact in the LTE system as the next generation mobile communication system, and the scheduler located at the base station manages the transmission resource allocation.

Recent studies are focused on the LTE-Advanced (LTE-A) for improving data rate with the adaptation of several new techniques to legacy LTE system and functionality enhancement of legacy terminal with the improved terminal operations. UE information procedure is one of the operation improvements. In the UE Information procedure includes RLF report, RACH report, MDT report, etc.

DISCLOSURE OF INVENTION

Technical Problem

When a UE performs random access among a plurality of eNBs, it is a problem that there is no way of informing the eNB whether the random access has succeeded or failed. In the present invention, when attempting access to an eNB after the random access failure, the UE transmits the measured channel information to the eNB to improve communication efficiency.

Solution to Problem

In accordance with an aspect of the present disclosure, a communication method of a terminal for transmitting information to a base station includes attempting random access to a first base station, generating, when the random access fails, an rlf-report including at least one information related to the random access, establishing a connection to one of base stations including the first base station, and transmitting the rlf-report to the connected base station.

In accordance with another aspect of the present invention, a communication method of a base station receiving information from a terminal includes establishing a connection with the terminal and receiving, when the random access performed by the terminal previously has failed, an rlf-report including at least one information related to the random access.

Advantageous Effects of Invention

The information transmission method and apparatus of the present invention is capable of allowing the UE to transmit channel information to the eNB even in the initial access to the eNB after random access failure such that the eNB performs scheduling based on the information reported by the UE, resulting in efficient communication.

BRIEF DESCRIPTION OF DRAWINGS

FIG. 17 is a drawing illustrating the UE operation of generating and reporting rlf-report when the random access has failed in a certain serving cell.

MODE FOR THE INVENTION

The present invention relates to a method and apparatus for transmitting UE-acquired information to the eNB efficiently. The present invention proposes a UE operation capable of reducing handover failure probability especially when the handover is required in the middle of the UE information procedure for RLF report, RACH report, and MDT report to the eNB and useful information capable of being transmitted in a UE Information message.

Figure 1:
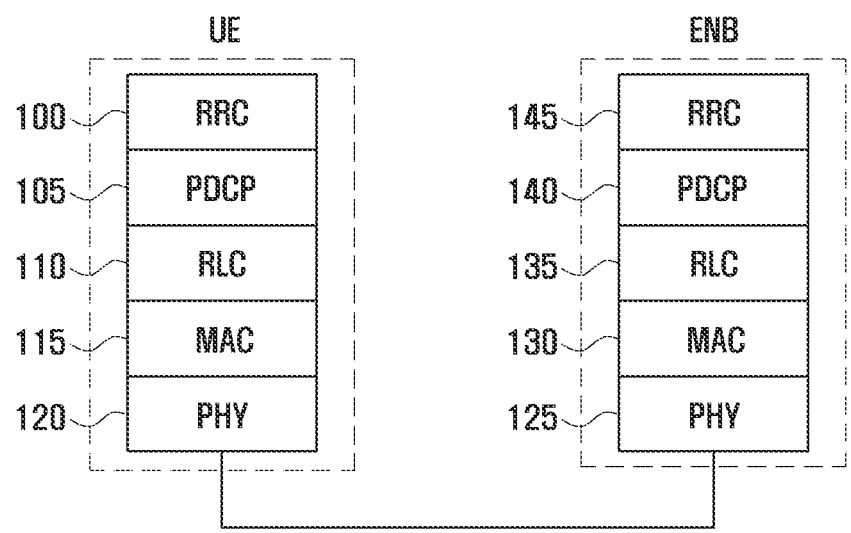
FIG. 1 is a diagram illustrating a protocol stack of the LTE system.

FIG. 1 is a diagram illustrating a protocol stack of the LTE system. As shown in FIG. 1, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, ciphering, and Integrity Protection, and the RRC 210 and 235 is responsible for reconstructing the PDCP Protocol Data Unit (PDU) into appropriate size. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. From the viewpoint of transmission, the data input to a protocol entity is referred to as Service Data Unit (SDU) and the data output from the protocol entity is referred to as Protocol Data Unit (PDU).

Figure 2:
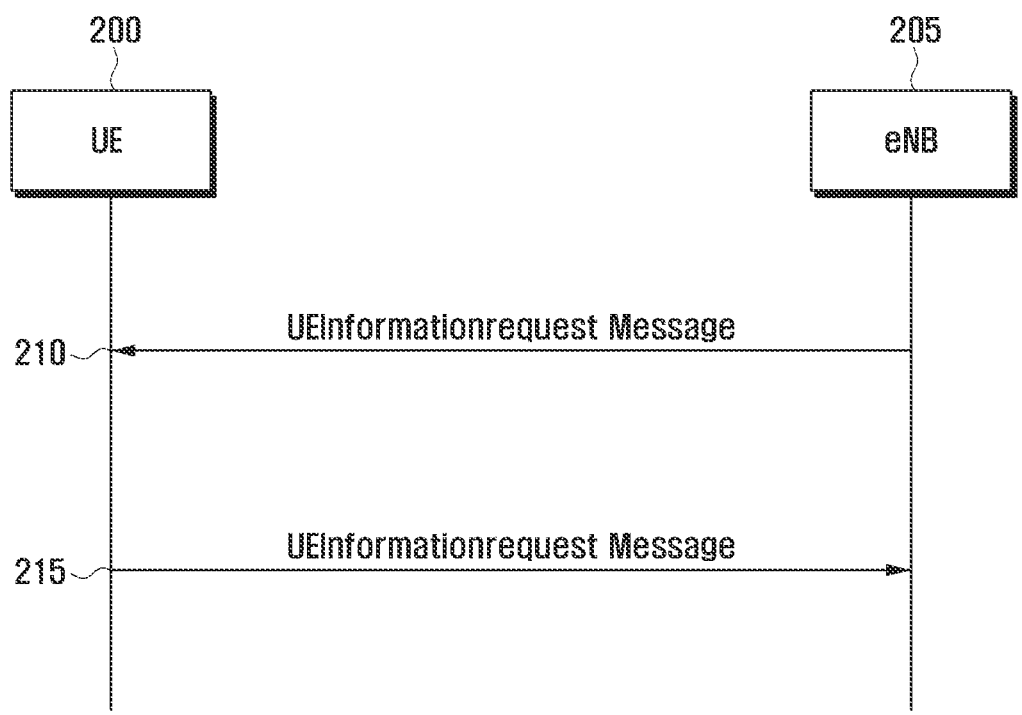
FIG. 2 is a drawing illustrating the UE Information procedure.

Among the RRC messages, the UE Information Request and UE Information response messages associated with the UE Information procedure are used for reporting the information acquired by the UE to an eNB. FIG. 2 is a drawing illustrating the UE Information procedure. The UE Information procedure is performed with the UE Information Request and UE Information Response messages. The eNB 205 requests the UE 200 for required information by transmitting the UE Information Request message. The eNB receives an indicator indicating that the UE has the related information before transmitting the UE Information Request message to the UE. The eNB determines whether to transmit the UE Information request message based on the indicator. The UE Information Request message may be used to request for three types of information reports, i.e. RLF report, RACH report, and MDT report. The RFL report is of logging the information collected at the most recent RLF time and reporting that information to the eNB afterward. The collected information for RLF report may be transmitted for one of MDT purpose and Mobility Robustness Optimization (MRO) purpose. The information includes serving and neighbor cell measurement informations, and cell ID. The RACH report is to report the information on the most recently succeeded random access. This information includes a number of preamble transmission times to succeed the random access and information on whether competition has occurred. The MDT report is to report the MDT measurement information collected in the idle mode to the eNB. This information includes serving and neighbor cell measurement information, cell ID, UE location information, and MDT configuration information. Such informations are deleted after being reported to the eNB and, if the RLF report and MDT report are not made in 48 hours, the UE may discard the corresponding informations. The UE reports the information requested in the UE Information Request message by transmitting the UE Information Response message to the eNB at operation 215.

The RRC and Non-Access Stratum (NAS) messages are transmitted on Signaling Radio Bearer (SRB) as a type of Radio Bearer (RB). The SRB is classified into three types with priorities. SRB0 has the highest priority and is used for transmitting RRC message using the CCCH logical channel. SRB1 is used for transmitting RRC message suing DCCH logical channel and special case NAS message. SRB2 is used for transmitting NAS message and MDT-purpose RRC message and has the lowest priority. Particularly, the UE Information Response message used in MDT report is classified into SRB2 message. This is because the MDT report is not the information to be transmitted urgently. The RLF report or RACH report may be transmitted along with the MDT report in one UE Information Response message, and the UE Information Response message including the MDT report is classified into SRB2 message regardless of the inclusion of the RLF report or RACH report. The UE Information Response message including no MDT report is classified into SRB1 message.

In the UE information procedure, a problem occurs when the UE receives the RRC Connection Reconfiguration message including MobilityControlInfo IE before transmitting the UEInformationResponse message to the eNB in response to the UEInformationRequest message. If the MobilityControlInfo IE is included in the RRC Connection Reconfiguration message, this means that the UE is instructed to perform a handover. Accordingly, in order to perform handover successfully, it is preferred to perform handover operation to the target cell immediately after checking the related IE. If the UEInformationResponse message is transmitted to end the UE Information procedure and then perform the handover, there must be some delay. The present invention proposes a UE operation of performing handover immediately without completion of the UE information procedure, and embodiments 1 and 2 relate to this operation. The present invention also proposes a method for transmitting supplementary information facilitating cell area optimization in the RLF report information transmitted in the UE Information Response message, and other embodiments, with the exception of embodiments 1 and 2, relate to this operation.

Embodiment 1

Figure 3:
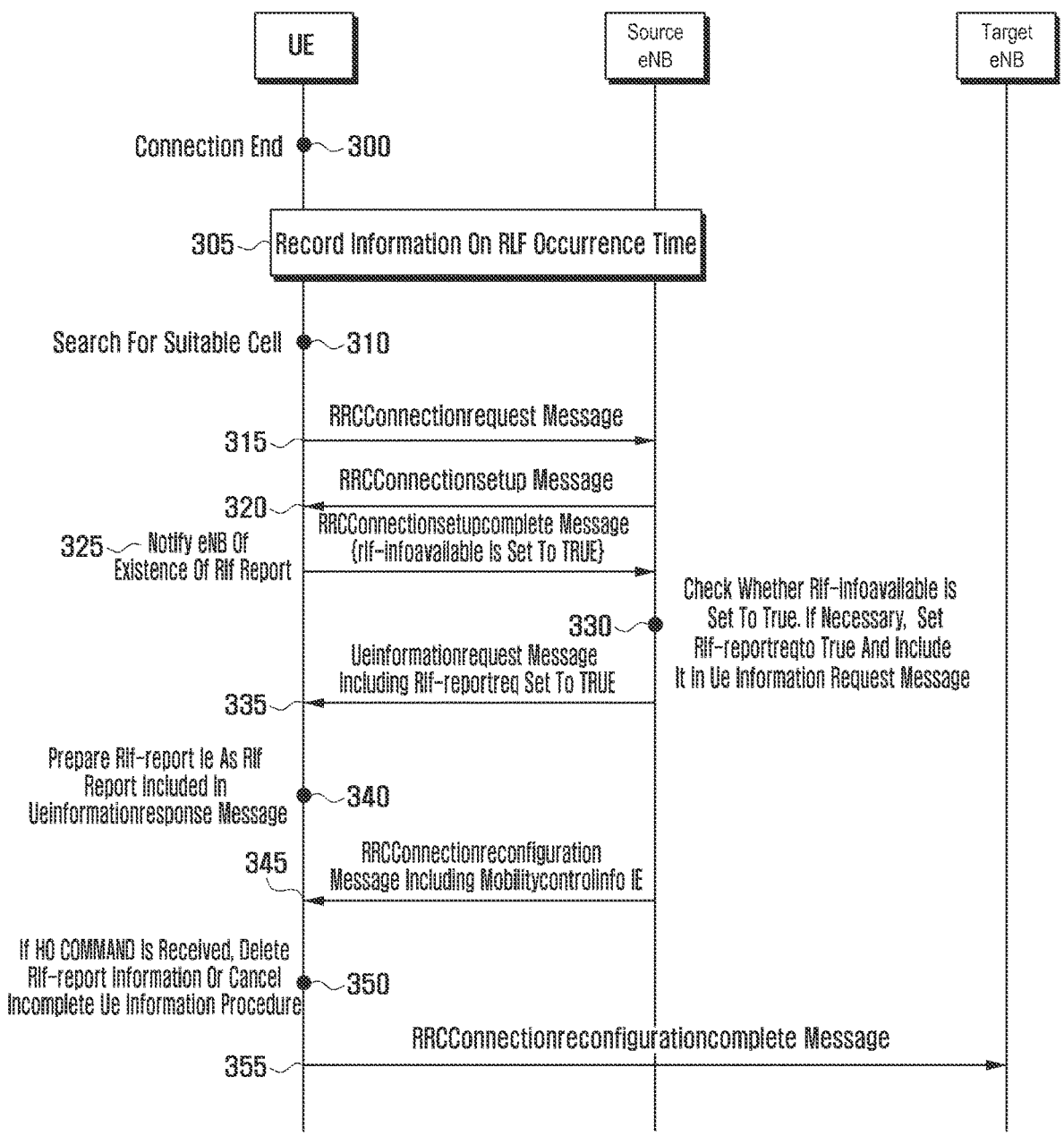
FIG. 3 is a diagram for explaining embodiment 1.

Embodiment 1 provides a method of deleting the related information or canceling incomplete UE Information procedure. FIG. 3 is a diagram for explaining embodiment 1. Although FIG. 3 is directed to the operation based on the RLF report, the present invention may be embodied with the RACH report or MDT report. The connection is released at operation 300 and the UE declares RLF. The UE records various informations at the time when the RLF occurs at operation 305. The UE searches again for a suitable cell that can be a serving cell. The suitable cell is the cell capable of providing the UE with normal services, i.e. fulfilling the following conditions:

The cell corresponds to the selected PLM or a PLMN in the registered PLMN or equivalent PLMN list Cell not barred Cell satisfying the Cell selection criterion In case of CSG cell, the cell of which CSG ID is in the whitelist of the UE If a new suitable cell is found, the UE may camp on to the corresponding cell at operation 315. If necessary, the UE sends the corresponding eNB an RRC Connection Request message to request for transition to the connected mode. Such a procedure is referred to as RRC connection establishment procedure. The eNB sends an RRC Connection Setup message to provide the user with the information necessary for transition to the connected mode at operation 320. The UE sends the eNB an RRC Connection Setup Complete message at operation 325 to notify that the RRC connection establishment procedure has completed successfully. The RRC connection Setup Complete message includes an indicator rlf-infoavailable set to TRUE which indicates that the UE has the RLF report information. In the case that there is the MDT report information, the UE sets an indicator logMeasAvailable to TRUE. The eNB determines whether the rlf-infoavailable is set to TRUE and, if RLF report is required, sets rlf-ReportReq to TRUE and includes the indicator in the UE Information Request message at operation 330. The eNB sends the UE the UE Information Request message including the rlf-ReportReq set to TRIE at operation 335. At this time, the UE Information Request message is configured as SRB1 type. The UE prepares an rlf-Report IE as the RLF report included in the UE Information Response message at operation 340. The UE receives the RRC Connection Reconfiguration message including MobilityControlInfo IE from the eNB at operation 345. The MobilityControlInfo IE includes HO COMMAND instructing to perform handover. If the UEInformationResponse message is transmitted to complete the UE Information procedure and then start the handover procedure, delay occurs. For successful handover, accurate timing is very important. Accordingly, the delayed handover causes reduction of success probability. In order to overcome the problem, the UE deletes rlf-Report information or cancels the incomplete UE Information procedure at operation 350. If the rlf-Report information is deleted, this means that the UE Information procedure has completed, although it is not true. Accordingly, although it operates in connected mode within another cell, the indicator indicating that the RLF report information is available is not included in the RRC Connection Setup Complete message. It is another method to cancel the incomplete UE Information procedure. Since the rlf-Report is kept by the UE continuously, if it enters the connected mode in another cell, the related indicator is included in the RRC Connection Setup Complete message to be transmitted to the eNB. If the UE attempts random access to the target eNB and succeeds the random access, it sends the RRC Connection Reconfiguration Complete message to notify of the handover completion.

Figure 4:
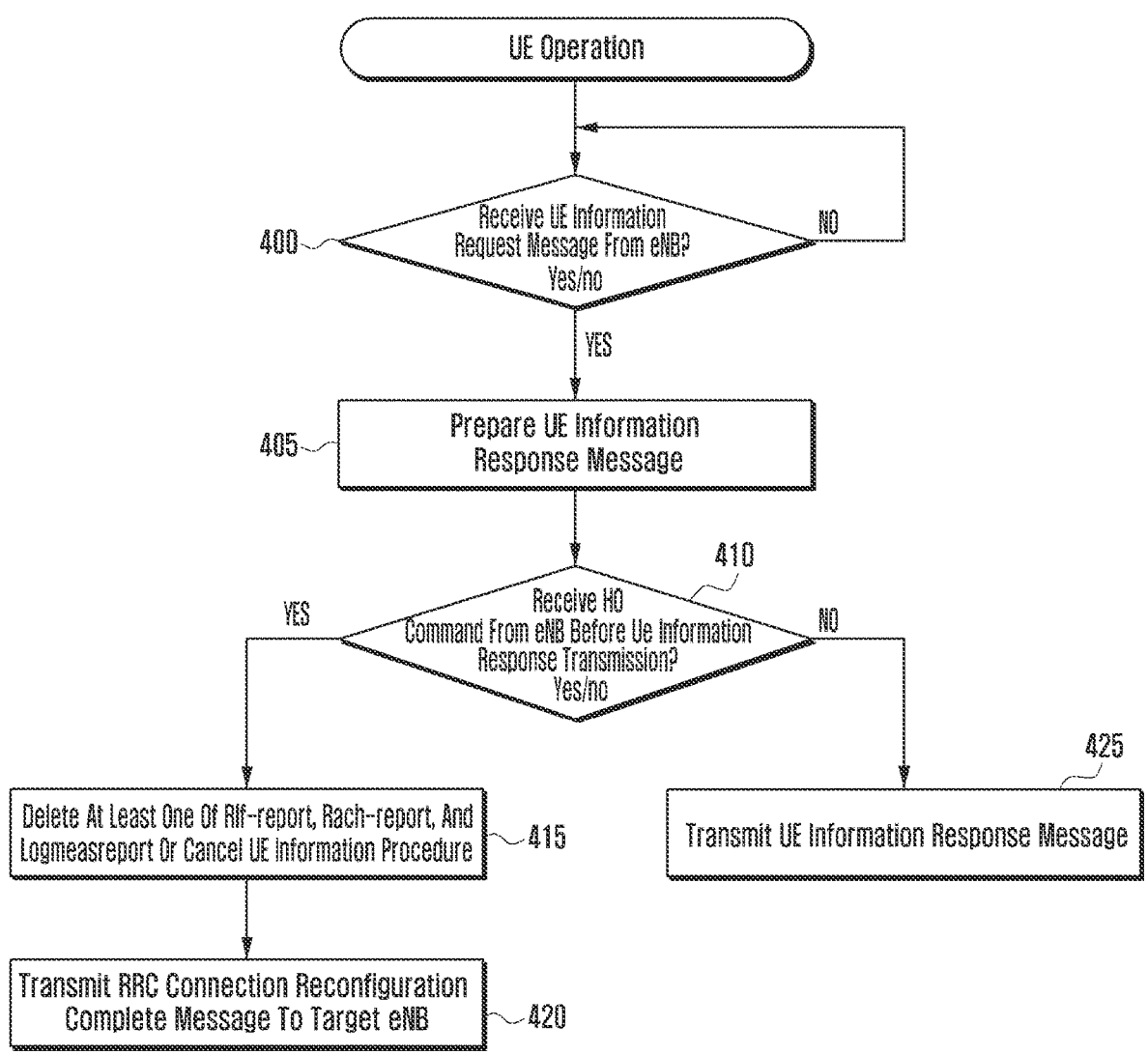
FIG. 4 is a drawing illustrating the UE operation according to embodiment 1.

FIG. 4 is a drawing illustrating the UE operation according to embodiment 1. The UE determines whether a UE Information Request message is received from the eNB at operation 400. The UE Information Request message may include rlf-ReportReq requesting for RLF report, rach-ReportReq requesting for RACH report, and logMeasReportReq requesting for MDT report. If the UE Information Request message including an IE requesting for a specific report, the UE prepares a UE Information Response message at operation 405. Before transmitting the UE Information Response message, the UE determines whether a RRC Connection Configuration message instructing to perform handover is received at operation 410. If the RRC Connection Configuration message is received, the UE deletes the related report information or cancels the ongoing UE Information procedure at operation 415. The UE sends the target eNB an RRC Connection Reconfiguration message to notify of the completion of the handover at operation 420. If the RRC Connection Configuration is not received, the UE transmits the UE Information Response message normally at operation 425.

Embodiment 2

Embodiment 2 provides a method for making it possible to perform a handover at the right time by changing the SRB type for the UE Information Response message according to a certain condition. As described above, if the MDT report is included in the UE Information Response message, the SRB type for the message is determined as SRB2 and, otherwise, SRB1. In addition to this condition, if a handover command is received, the UE configures the SRB type as SRB2 to facilitate the handover operation.

Figure 5:
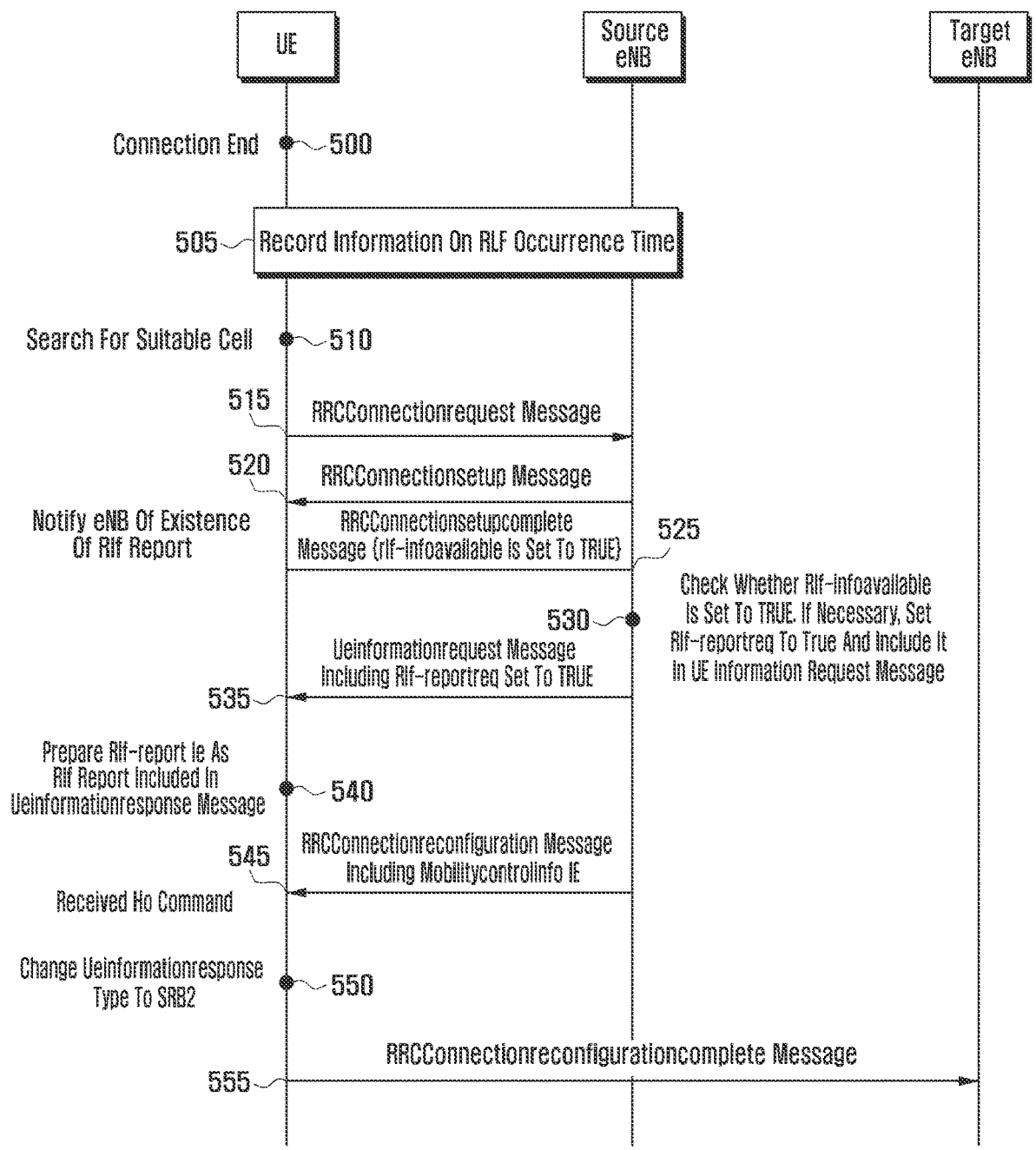
FIG. 5 is a drawing for explaining the embodiment 2.

FIG. 5 is a drawing for explaining the embodiment 2. Operations 500 to 545 are identical with operations 300 to 345 of FIG. 3. If the RRC Connection Reconfiguration message including MobilityControlInfo IE is received from the eNB at operation 345, this means to instruct to perform handover. The UE changes the SRB type of the UE Information Response message to be transmitted to SRB2 at operation 550. If the UE Information Request message includes MDT report request, this means that the UE Information Response message has been configured to be transmitted on SRB2. In the present invention, even when the handover execution is instructed by the RRC Connection Reconfiguration message, the UE configures the UE Information Response message as SRB2 type message. If the random access attempted to the target eNB succeeds, the UE an RRC Connection Reconfiguration Complete message to notify of the completion of handover at operation 355.

Figure 6:
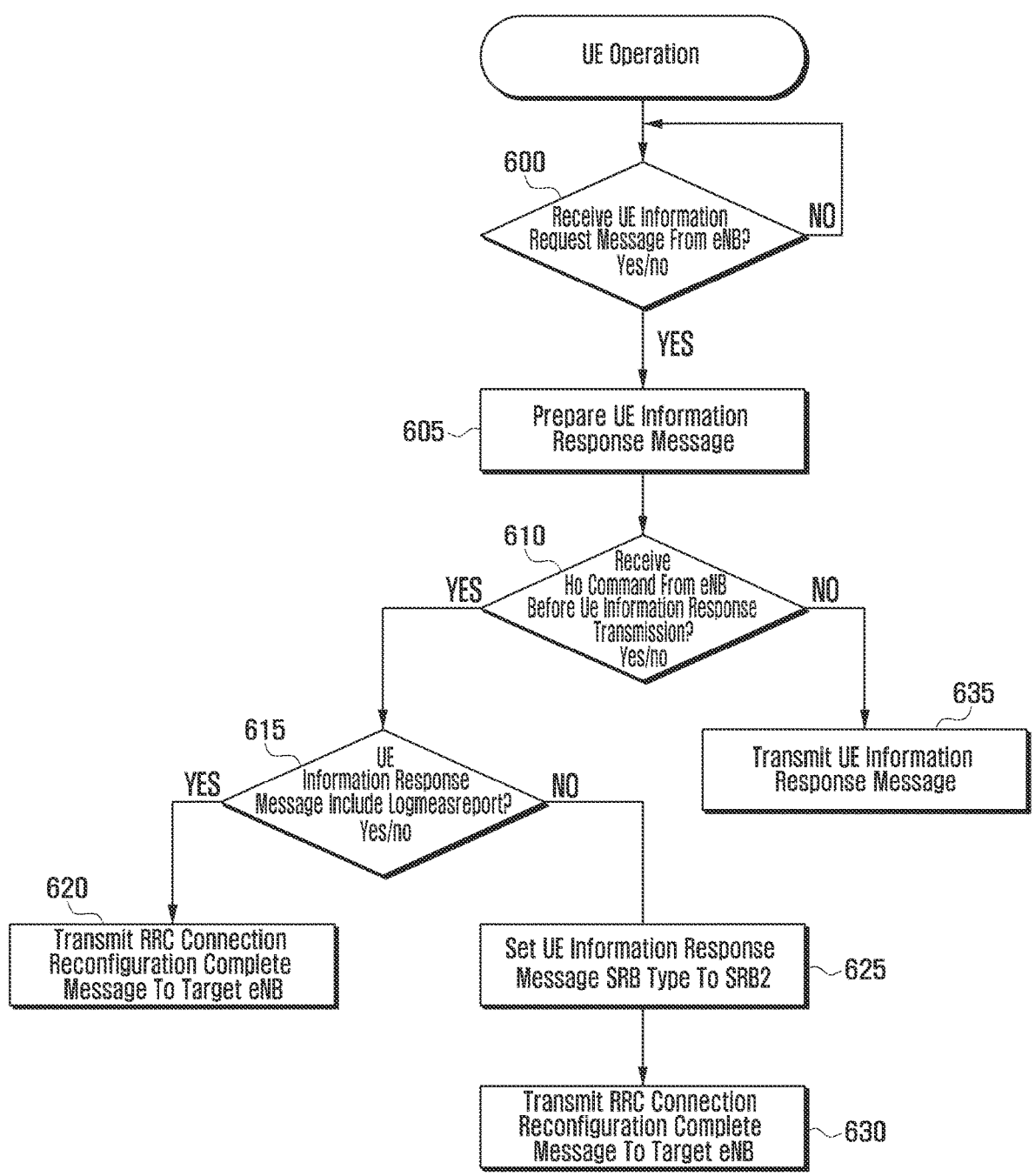
FIG. 6 is a drawing illustrating the UE operation according to embodiment 2.

FIG. 6 is a drawing illustrating the UE operation according to embodiment 2. The UE determines whether a UE Information Request message is received from the eNB at operation 600. The UE Information Request message may include rlf-ReportReq requesting for RLF report, rach-ReportReq requesting for RACH report, and logMeasReportReq requesting for MDT report. If the UE Information Request message including an IE requesting for a specific report, the UE prepares a UE Information Response message at operation 605. The UE determines whether an RRC Connection Configuration message instructing to perform handover is received before transmitting the UE Information Response message at operation 610. If the message is received, the UE determines whether to include the logMeasReport IE as MDT report information in the UE Information Response message at operation 615. If it is determined to include the IE, this means that the corresponding UE Information Response message is SRB2 type according to the conventional technology. If the logMeasReport IE is included, the UE sends the target eNB the RRC Connection Reconfiguration message to notify of the handover completion at operation 620. Since the SRB type of the UE Information Response message including logMeasReport IE is SRB2 of which priority is lower than that of the SRB 2 as the SRB type of the RRC Connection Reconfiguration message, the RRC Connection Reconfiguration message may be transmitted with priority. If the logMeasReport IE is not included, the SRB type of the UE Information Response message is set to SRB2 at operation 625. The UE sends the target eNB the RRC Connection Reconfiguration message to notify of the handover completion instead of the UE Information Response message according to the priority of SRB type at operation 630.

Embodiment 3>, <Embodiment 4>, <Embodiment 5>, and <Embodiment 6> provide the methods of including RLF occurrence time information in the RLF report. For cell area optimization, the RLF occurrence time information is very useful. This is because the traffic concentration degree varies depending on the time information in the RLF report. Accordingly, the present invention proposes a method of acquiring the information on the time when the RLF occurs to log the time information for use in the RLF report.

Embodiment 3

Embodiment 3 provides a method of providing absolute time through the RRCConnectionReconfiguration and LoggedMeasurmentConfiguration and logging, at the UE, starting a timer (or counter) to log the RLF occurrence time. If RLF occurs after a predetermined time has elapsed, the UE calculates the RLF occurrence time using the absolute time and the timer value and records the calculation result. The UE at which the RLF has occurred sends the UE the configuration information associated with the counter, and the UE may report the error range of the RLF time as well as the location information. The absolute time and counter configuration information is provided in a single RRCConnectionReconfiguration or LoggedMeasurementConfiguration, or the absolute time is provided in plural RRCConnectionReconfiguration or LoggedMeasurementConfiguration messages, the most recent absolute time being maintained and counter restarts in newly provided unit.

Figure 7:
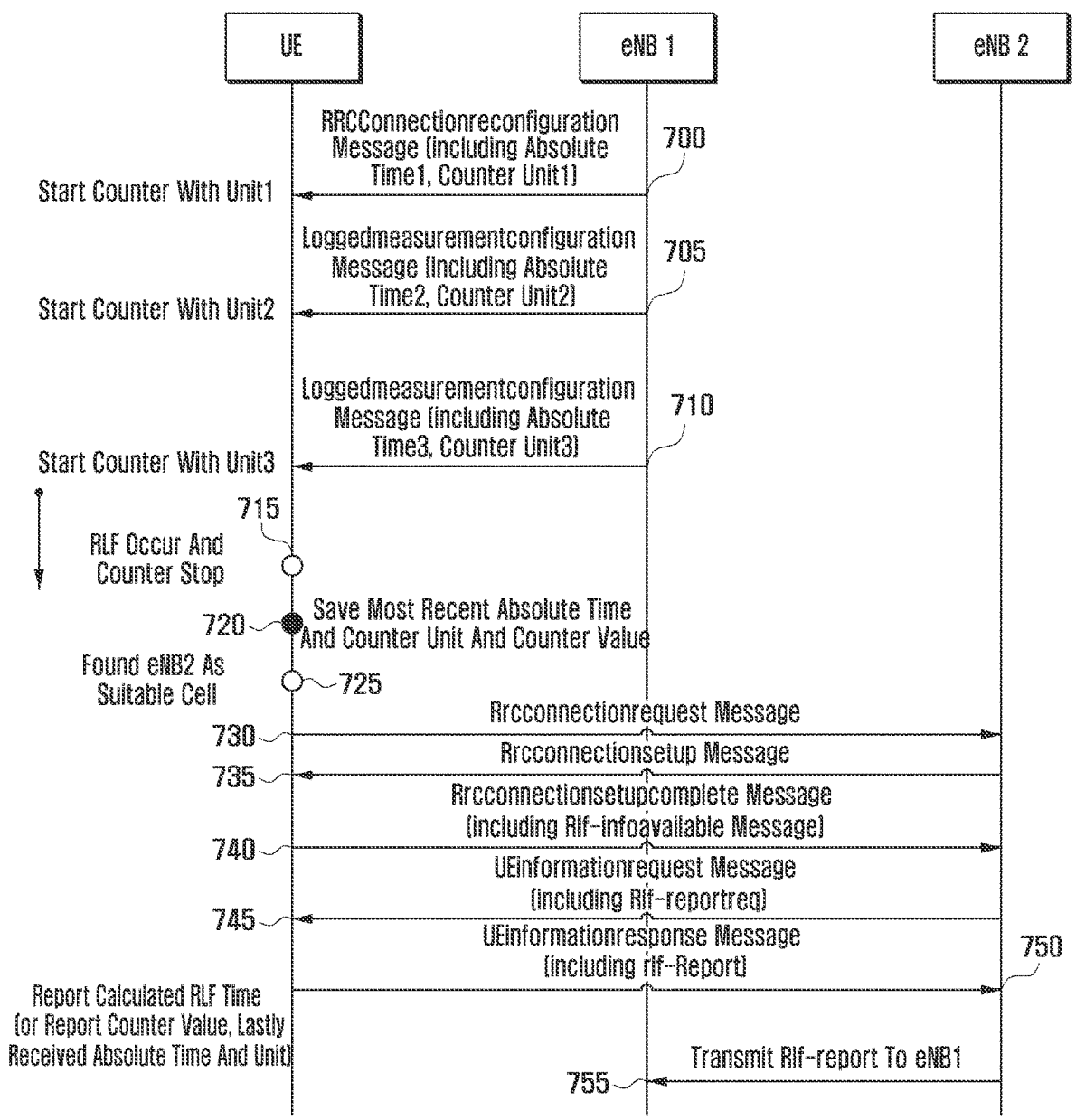
FIG. 7 is a drawing illustrating embodiment 3.

FIG. 7 is a drawing illustrating embodiment 3. The eNB transmits the RRCConnectionReconfiguration message including the absolute time and counter unit at operation 700. The eNB transmits the LoggedMeasurementConfiguration message including the absolute time and counter unit to the UE at operation 705. The UE applies the new absolute time and counter unit to restart the counter. The eNB transmits the RRCConnectionReconfiguration message for transferring HO command which includes the absolute time and counter unit to the UE at operation 710. The UE restarts the counter by applying the absolute time and counter unit. RLF occurs at operation 715. The UE stops the counter. The UE saves the most recent absolute time and counter unit and counter value at operation 720. The UE searches for a new suitable cell at operation 725. The UE transmits the RRCConnectionRequest message to the new eNB to communicate with the corresponding cell at operation 730. The new eNB transmits RRCConnectionSetup message at operation 735. The UE transmits RRCConnectionSetupComplete message with the indication of existence of the information related to RLF at operation 740. The eNB requests for the RLF stored in the UE using the UEInformationRequest message at operation 745. The UE reports the store information using UEInformationResponse message at operation 750. The new eNB transmits the corresponding information to the eNB at which the RLF has occurred at operation 755.

Embodiment 4

In embodiment 4, the counter starts when RLF occurs, the counter value is reported in the RLF report after reconnection. The eNB calculates the RLF occurrence time using the counter value and RLF report reception time and records the calculation result, and the eNB at which RLF has occurred sends the counter configuration information to the UE in advance. For example, the information includes counter unit and, the UE reports the unit value along with the counter value in RLF report.

Figure 8:
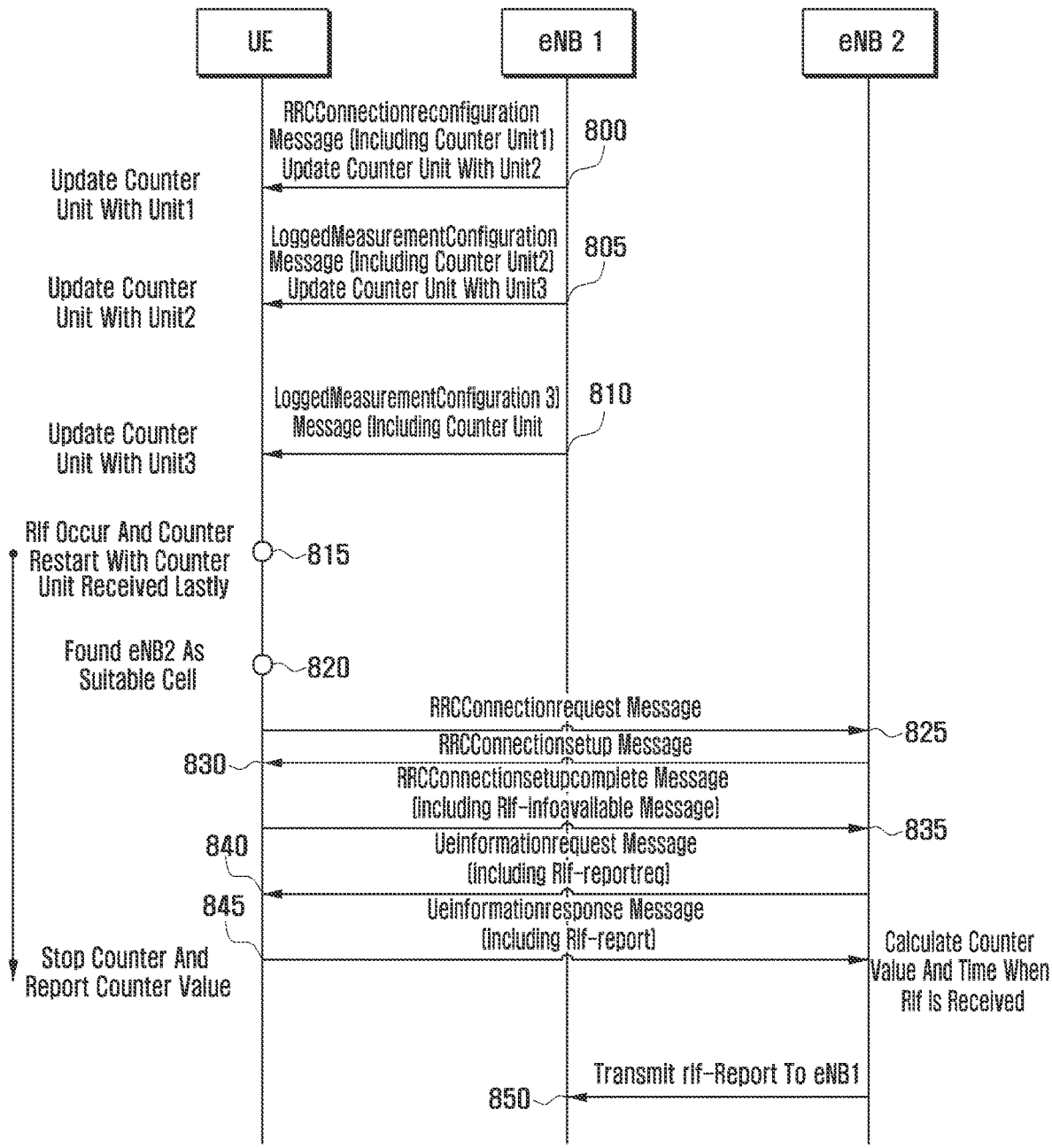
FIG. 8 is a diagram for explaining the embodiment 4.

FIG. 8 is a diagram for explaining the embodiment 4. The eNB sends the UE the RRCConnectionReconfiguration message including a counter unit at operation 800. The eNB sends the UE the LoggedMeasurementConfiguration message including the counter unit at operation 805. The UE stores the new counter unit. The eNB sends the UE the RRCConnectionReconfiguration message for the purpose of transferring HO command at operation 810, the message including the counter unit. The UE stores the new counter unit. RLF occurs at operation 815. The UE starts the counter using the stored counter unit. The UE searches for a new suitable cell at operation 820. In order to communicate with the corresponding cell, the UE sends the new eNB the RRCConnectionRequest message at operation 825. The new eNB sends the RRCConnectionSetup message at operation 830. The UE sends the RRCConnectionSetupComplete message along with the indication notifying of the existence of RLF information at operation 835. The eNB requests for the RLF information stored in the UE using the UEInformationRequest message at operation 840. Upon receipt of the request, the UE stops the counter and reports the counter value using the UEInformationResponse message at operation 845. The eNB calculates the RLF occurrence time using the received information and RLF reception time. The new eNB sends the corresponding information to the eNB at which the RLF has occurred.

Embodiment 5

Embodiment 5 proposes a method of recording the RLF occurrence time using the GNSS time. If the GNS time is not available, it is possible to use the UE local time. Global Navigation Satellite System (GNSS) is a satellite navigation system capable of providing the UE with the location and time information. GPS and GLONASS are the systems for the same purpose and, other the present invention is directed to the GNSS, other system may be used for the same purpose. GNSS time guarantees high accuracy and very useful because there is no need of complex time information acquisition procedure as in embodiments 3 and 4.

Figure 9:
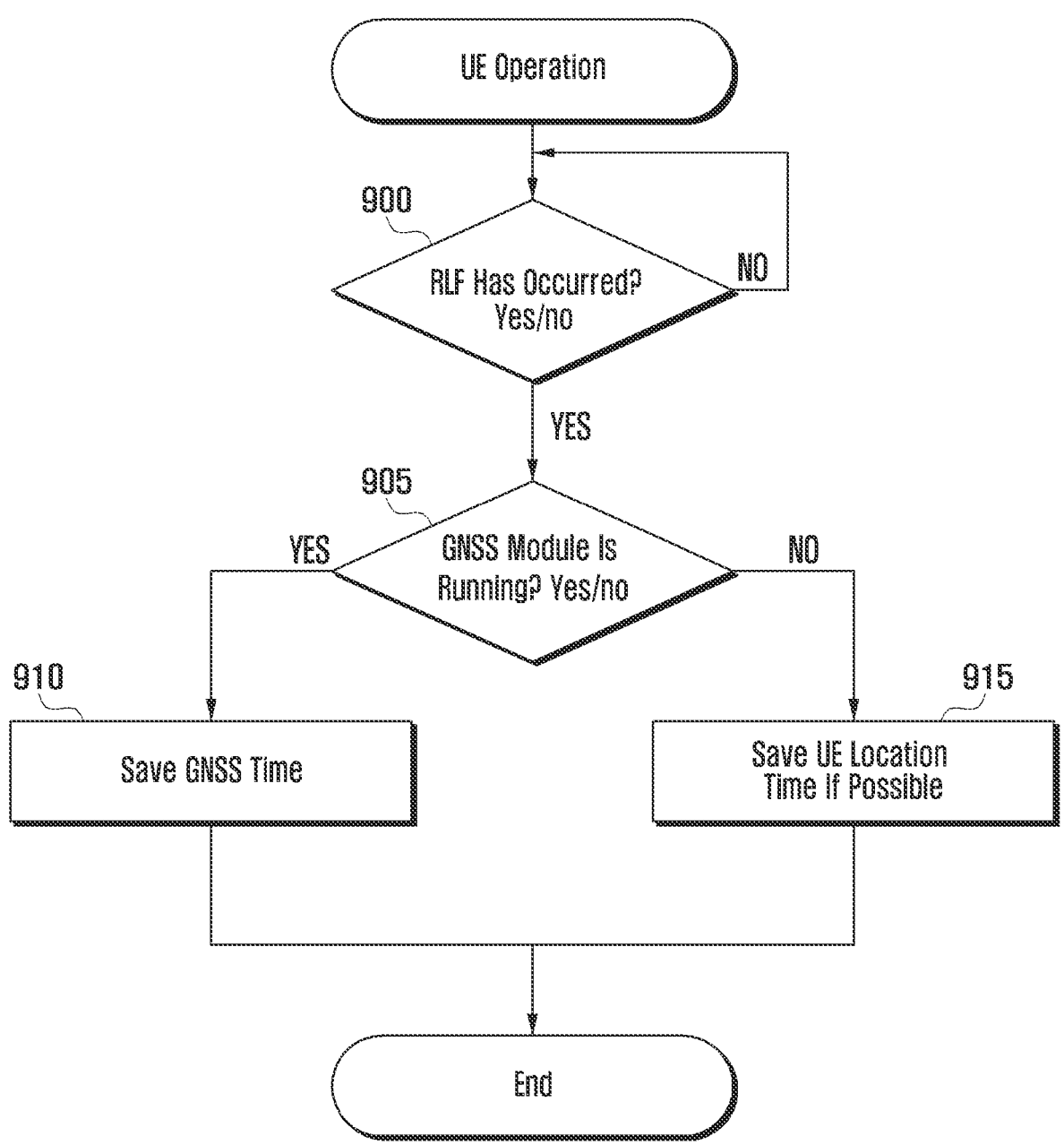
FIG. 9 is a flowchart for explaining the embodiment 5.

FIG. 9 is a flowchart for explaining the embodiment 5. The UE checks whether RLF has occurred at operation 900. The UE checks whether the GNSS module of the UE is activated at operation 905. If the GNS module is activated, the UE acquires the GNSS time from the GNSS module and records the GNSS time. The UE may requests the GNSS module to provide the time information or use the time information received form the GNSS module most recently. Otherwise if the GNSS module is not operating, the UE records the UE local time at operation 915. The information may be reported to the eNB in the form of RLF report.

Embodiment 6

In the embodiment 6, the UE starts the timer upon receipt of the GNSS time and, if RLF occurs after elapse of a predetermined time, calculates the RLF occurrence time using the GNSS time and the timer value, the RLF occurrence time being recorded. In the embodiment 5, it is required that the GNSS module is running at the time when the RLF occurs so as to acquire the time information form the GNSS module. In the embodiment 6, if the GNSS module has been activated at least one time before the RLF occurrence such that the GNSS time has been received from the GNSs module, it is possible to acquire the RLF occurrence time using the GNS time.

Figure 10:
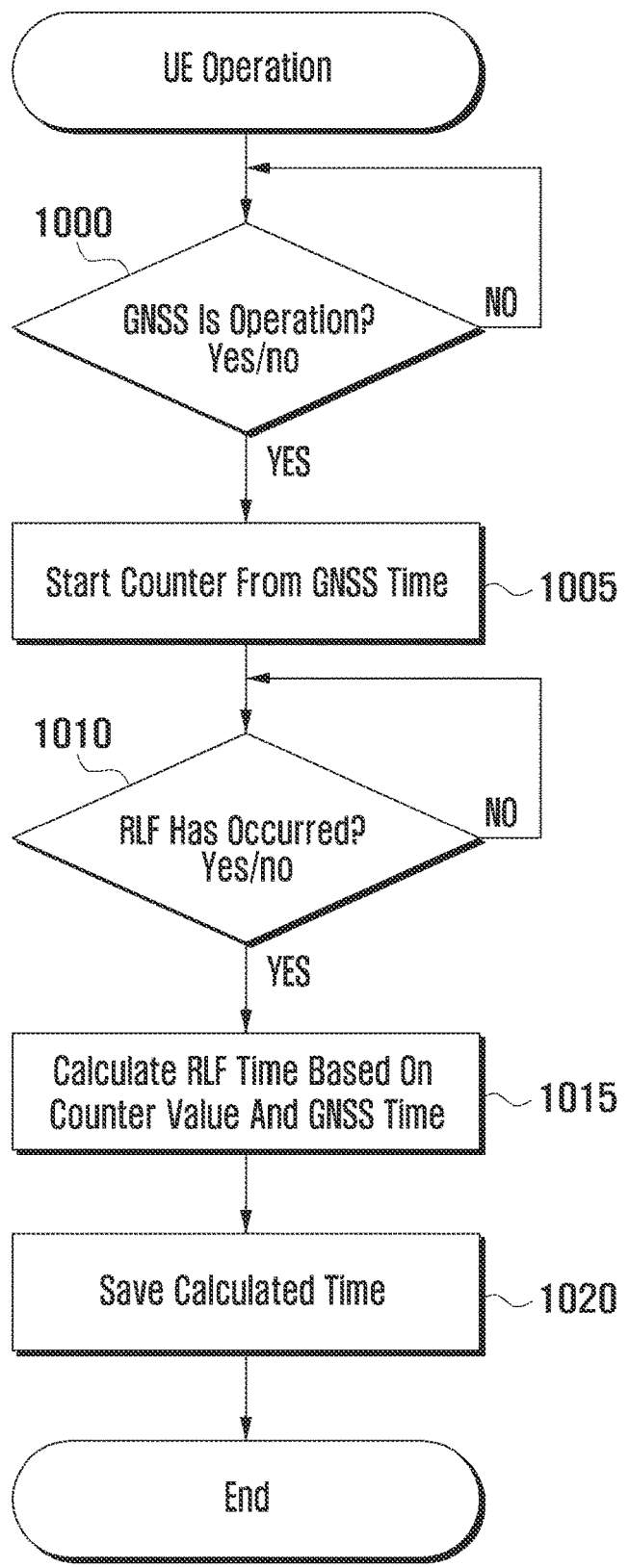
FIG. 10 is a drawing for explaining the embodiment 6.

FIG. 10 is a drawing for explaining the embodiment 6. The UE checks whether the GNSS module is operating at operation 1000. If the GNSS module is operating, the UE receives GNSS time and starts the timer since then at operation 1005. The UE checks whether the RLF has occurred at operation 1010. If the RLF has occurred, the UE calculates the RLF occurrence time using the previously received GNSS time and the timer value at operation 1015. The UE records the calculated time information at operation 1020. This information is reported to the eNB in the form of RLF report.

Embodiment 7

In addition to the RLF occurrence time information, the information useful for cell area optimization may be included in the rlf-report IE. Embodiment 7 proposes the useful information and UE operation for generating and transmitting rlf-report when random access has failed in a certain serving cell. In the conventional technology, the rlf-Report includes the information collected at the RLF occurrence time. In contrast, the present invention is characterized in that the rlf-report is generated and transmitted even when the random access attempt (or RRC connection establishment attempt) fails as well as when the RLF occurs. When the next RRC connection is established, the UE reports the information on presence/absence of the RLF-report to the eNB. Before the RRC connection is established successfully, the UE may fail connection attempts several times. In this case, there may be several RLF reports. Accordingly, the UE may store all of the reports. In order to reduce signaling overhead, it is possible to reduce the number of RLF reports to be stored or restrict the number of RLF reports to a predetermined value. The eNB may request for the RLF-report through UE Information procedure, and the UE generates rlf-Report to the eNB. If it fails to attempt random access to a certain serving cell (or RRC connection establishment), the UE records the following informations.

Indicator for indicating that the RLF report is generated due to the failure of the random access or RRC connection establishment to the serving cell serving cell information PCI (Physical Cell ID), frequency information pathloss-related serving cell measurement information. The corresponding information may include pathloss for use in calculating transmit power of the Random Access Preamble in the random access procedure and channel quality, i.e. RSRP/RSRQ or pathloss, of the corresponding cell when the random access has failed. It is also possible to include the maximum transmit power of the preamble and Power Headroom (PH) information.

PCell or SCell random access failure or not: The LTE-A UE is capable of using the technique of transmitting data on multiple carriers, i.e. Carrier Aggregation (CA) and, in this case, random access may be attempted in the PCell and SCell. At this time, it is notified that which random access has failed.

Neighbor cell measurement information reestablishmentCellId: ID of the cell to which reestablishment has been attempted after connection failure. It is introduced for the purpose of Mobility Robust Optimization (MRO) and used for checking the reason for handover failure.

timeConnFailure: Time elapsed from the last HO attempt to the connection failure. It is introduced for the purpose of MRO and used for checking the reason for handover failure.

previousPCellId: ID of the source PCell which has performed the last handover. It indicates the source PCell which has transmitted RRC Connection Reconfiguration message including IE MobilityControlInfo.

Access Failure Type: It is used for indicating access failure reason. The access failure reasons may include random access problem, T300 timer expiry, etc. If the random access procedure fails after an allowed number of the preamble retransmissions, the UE regards as there is a random access problem. The T300 timer starts when the UE transmits the RRC connection request message and, if an RRC connection setup or RRC connection reject message is not received from the eNB until the T300 timer expires, the UE regards as the corresponding RRC connection establishment has failed. It is also possible to inform that the allowed number of retransmissions has been reached before the expiry of T300.

RLF report creation time: It indicates the time when the random access (RRC Connection Establishment) attempt has failed in the serving cell. The corresponding time may be calculated in various ways including the methods proposed in embodiments 5 and 6.

UE location at the time when RLF report is created

Figure 11:
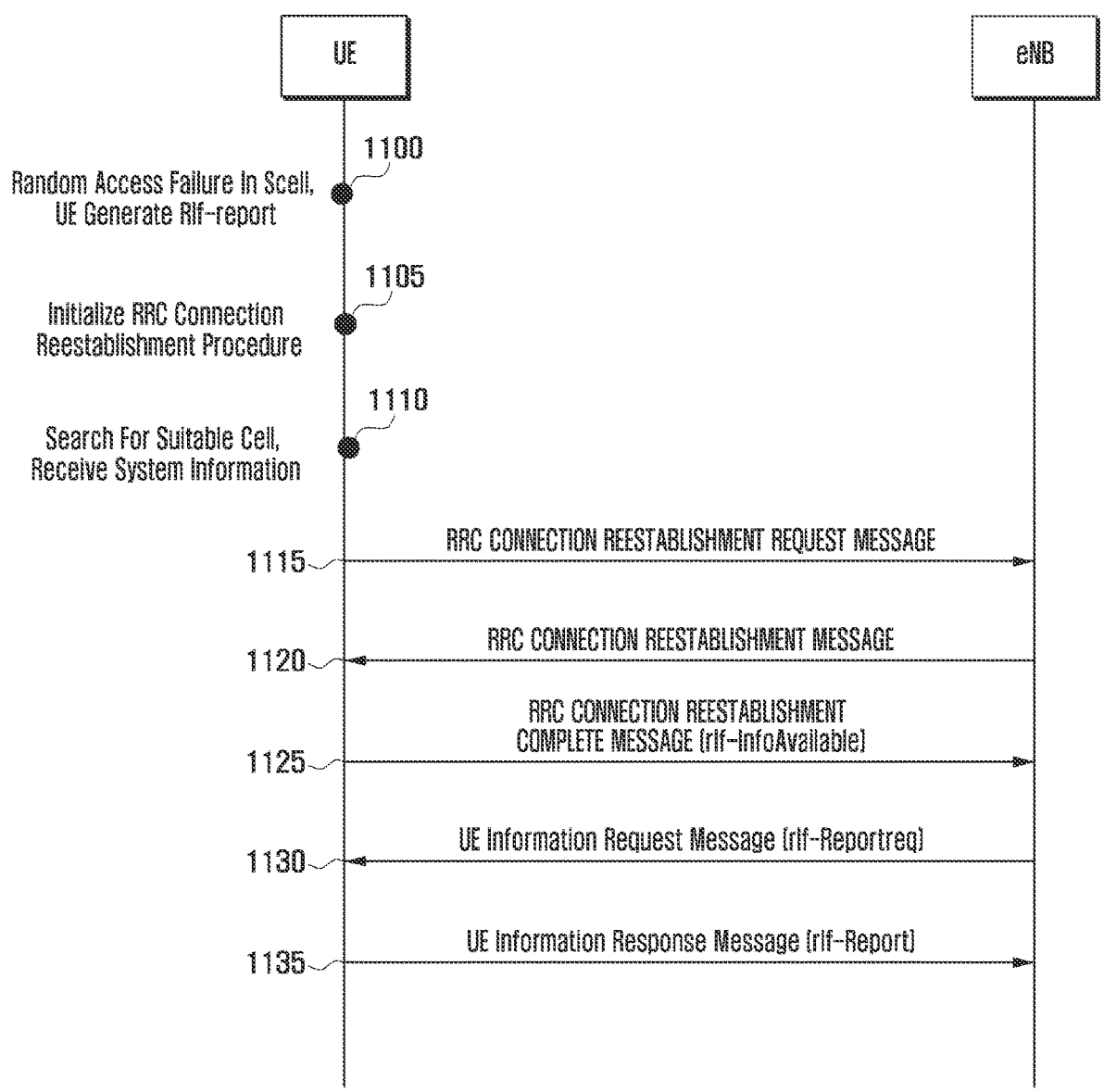
FIG. 11 is a drawing for explaining the UE operation of generating rlf-report and reporting the rlf-report when the random access has failed in a certain serving cell.

FIG. 11 is a drawing for explaining the UE operation of generating rlf-report and reporting the rlf-report when the random access has failed in a certain serving cell. FIG. 11 is directed to a scenario in which the UE which has failed random access to an SCell succeeds reestablishment and connects to the SCell again.

The UE performs random access procedure in the SCell at operation 1100. The serving cells belonging to the same Time Alignment Group (TAG) has the same uplink timing synchronization and it is not necessary that the uplink timing of the SCell matches that of the PCell. If uplink cell exists, there must be the downlink corresponding there to in the SCell. In order to control the uplink timing synchronization, a PDCCH order indicating random access is sent to the UE using PDCCH of the SCell downlink. Since the cross scheduling is possible in the LTE-A, if the PDCCH order having the Carrier Indicator Field (CIF) indicating uplink SCell is received, the UE attempts random access in the corresponding uplink cell. If the random access procedure is not completed even when a predetermined allowed preamble retransmission times is reached, the UE regards as the random access procedure has failed. At this time, the UE IE rlf-Report and includes the aforementioned information in the corresponding IE.

Indicator informing that the RLF report is generated due to the failure of random access attempt or RRC connection establishment attempt in the serving cell serving cell information PCI (Physical Cell ID), frequency information pathloss-related serving cell measurement information. The corresponding information includes the pathloss value for use in calculating transmit power of the Random Access Preamble in the random access procedure and channel quality, i.e. RSRP/RSRQ or pathloss, of the corresponding cell. The Power Headroom (PH) information also may be included.

PCell or SCell random access failure or not: The LTE-A UE is capable of using the technique of transmitting data on multiple carriers, i.e. Carrier Aggregation (CA) and, in this case, random access may be attempted in the PCell and SCell. At this time, it is notified that which random access has failed.

neighbor cell measurement information, etc.

The UE initializes the RRC connection reestablishment procedure at operation 1105. Typically, if random access failure occurs, this means that there is a problem in the cell to which the random access has been attempted and thus it is preferred for the UE to search for another suitable cell. In the RRC connection reestablishment procedure, the UE searches for the cell fulfilling a predetermined threshold value of the channel condition and, at this time, there is a probability of reselecting the cell to which the random access has been attempted. The present invention proposes a method of selecting the suitable cell among the cells with the exception of the cell to which the random access has been attempted.

If a suitable cell is found at operation 1110, the UE receives the system information of the corresponding cell.

The UE performs random access procedure to the cell and transmits an RRC CONNECTION REESTABLISHMENT REQUEST message. If the RRC CONNECTION REESTABLISHMENT REQUEST message is transmitted successfully, the UE waits for receiving an RRC CONNECTION REESTABLISHMENT message.

If the eNB has the UE context information of the UE, it sends the UE the RRC CONNECTION REESTABLISHMENT message to reestablish the RRC connection at operation 1120.

The UE transmits an RRC CONNECTION REESTABLISHMENT COMPLETE message including an indicator informing that it has the rlf-Report to report at operation 1125. If the RRC CONNECTION REESTABLISHMENT procedure fails, the UE attempts the RRC CONNECTION SETUP procedure. At this time, the indicator informing of the presence/absence of rlf-Report is transmitted to the eNB in the RRC CONNECTION SETUP COMPLETE or RRC CONNECTION RECONFIGURATION COMPLETE message.

The eNB commands to report the IE rlf-Report using the UE information request message at operation 1130.

The UE reports the above information to the eNB using the UE information response message at operation 1135.

Although FIG. 11 is directed to the scenario in which the UE which has failed random access reestablishes connection successfully, it may also be applied to the scenario in which the UE which has failed initial connection establishment reestablishes the connection successfully.

FIG. 17 is a drawing illustrating the UE operation of embodiment 7. The UE attempts random access at operation 1700. The random access procedure may be performed in PCell or SCell. In the case of SCell, if a PDCCH order of the downlink SCell linked to the corresponding uplink SCell is received, the random access is attempted to acquire synchronization. Since the cross scheduling is possible in the LTE-A, the PDCCH order of the downlink SCell includes a Carrier Indicator Field (CIF) indicating uplink SCell. If the random access fails at operation 1705, the UE records the first information, the second information, and the third information as follows at operation 1710. These informations have been described above already. Additionally, other informations may be includes as described above.

The first information is the information indicating whether the rlf-report is triggered by the random access failure.

The second information is the information indicating whether the random access failure has occurred in PCell or SCell.

The third information is the information for determining the UE's uplink channel state at the time when the random access has failed.

The UE stores the RLF report at operation 1715. The UEs searches for a suitable cell and, if the RRC connection setup or RRC connection reestablishment message is received successfully in correspondence to the RRC connection request or RRC connection reestablishment request message, the UE transmits an RRC connection setup complete or RRC connection reestablishment complete message including an indicator that it has the RLF report at operation 1725. The UE waits for receiving the UE Information Request message requesting for the stored RLF report from the eNB at operation 1730. In response to the UE Information Request message, the UE sends the eNB a UE Information Response message including the RLF report at operation 1735.

Embodiment 8

Figure 12:
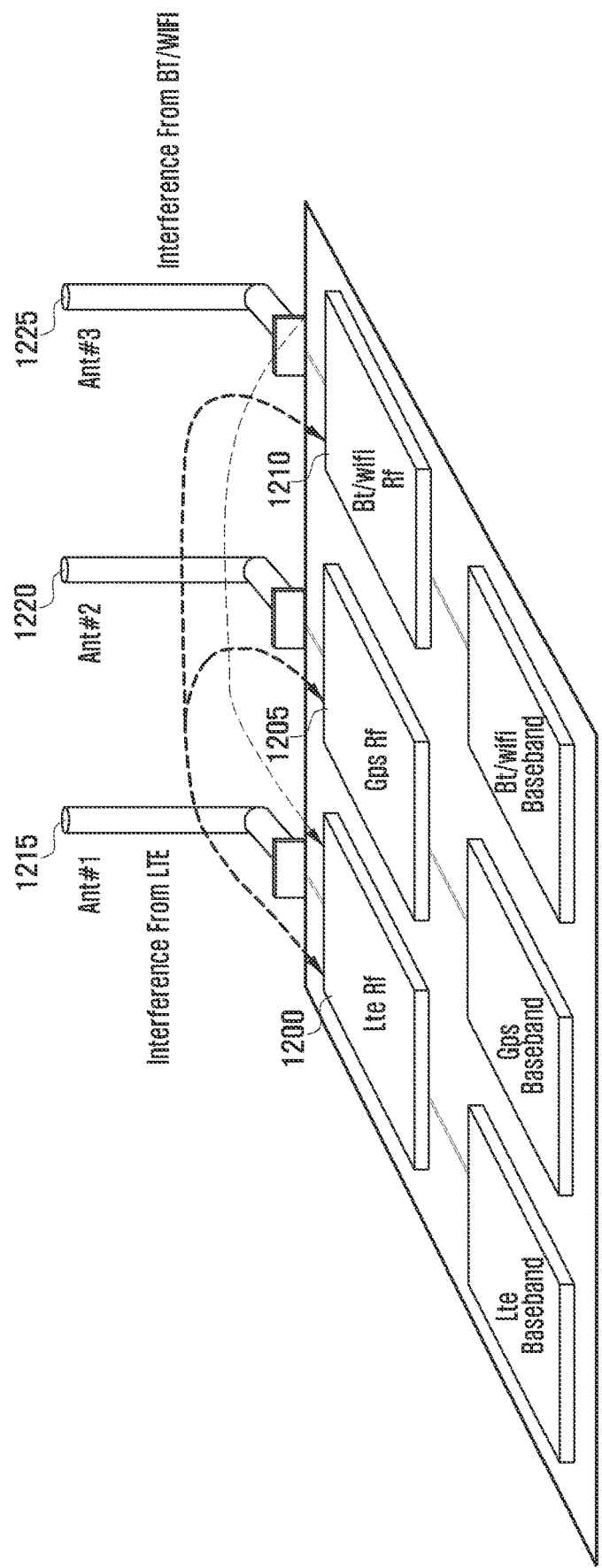
FIG. 12 is a drawing for explaining IDC.

Embodiment 8 relates to a method and apparatus for reporting the influence of IDC to the eNB in order to minimize the problem caused by the In-Device Coexistence (IDC). FIG. 12 is a drawing for explaining IDC. IDC is a technology under research for minimizing the interference between communication modules embodied in a device. Recent terminals are provided with various functions for which several communication modules may be included. In addition to the LTE communication module 1200, a GPS module 1205 and a short range communication module 1210 such as Bluetooth and WLAN module. Such modules perform data communication through respectively connected antennas 1215, 1220, and 1225. Although the communication systems operate on different frequency bands, the adjacent bands may cause interference between communication modules operating thereon. This is because it is impossible to separate the signals on the bands ideally. Furthermore, the antennas connected to the respective communication modules are included in one terminal device, they are arranged tightly in distance. Accordingly, the interference between them may be strong relatively. In order to mitigate such interference, it is necessary to control the transmit powers of the communication modules. For example, the short range communication module 1210 such as Bluetooth and WLAN attempts data reception on LTE uplink, the transmission signal of the LTE communication module 1200 may cause interference to the short range communication module. In order to mitigate this interference, it is possible to control the interference amount by restricting the uplink maximum transmit power of the LTE communication module. Also, it is possible to nullify the interference power amount influencing the short range communication module by suspending the operation of the LTE communication module. In contrast, the short range communication module 1210 may interfere the reception signal of the LTE communication module 1200 on the LTE downlink. This embodiment proposes a method for reporting the influence of the short range communication module on the LTE downlink to the eNB. Such a report may be used efficiently to minimize the influence of the short range communication module in such a way that the eNB controls the downlink scheduling.

In this embodiment, new LTE measurement for IDC control is defined as follows.

If the RSRQ of the affected subframe of the serving cell on the serving frequency becomes equal to or less than a predetermined threshold due to the IDC, the Measurement Report (MR) is triggered. In the MR, the measurement results at the affected subframe and non-effected subframe are reported distinctively.

Although the RSRQ of the affected subframe of the best cell on the non-serving frequency becomes equal to or less than the threshold due to the in-device interference, MR is not triggered. If MR is triggered for another reason, the measurement result in the best cell of the no-serving frequency is reported for distinct affected subframe and non-affected subframe. Also, it includes the information indicating that the result is affected by in-device interference.

The UE reports the state change on a frequency (RRM interested frequencies) indicated by the eNB. If the frequency state changes from the usable state to the unusable state or vice versa due to the IDC, the UE sends the eNB a predetermined control message. This control message may include the following informations. Here, the RRM interested frequencies are the frequencies for which the UE is interested in the inter-frequency handover. For example, the frequencies affected by IDC are almost predetermined. That is, this is the case between the WLAN and Bluetooth frequencies and LTE band. Accordingly, it is meaningless to report the state change of other frequencies.

Figure 13:
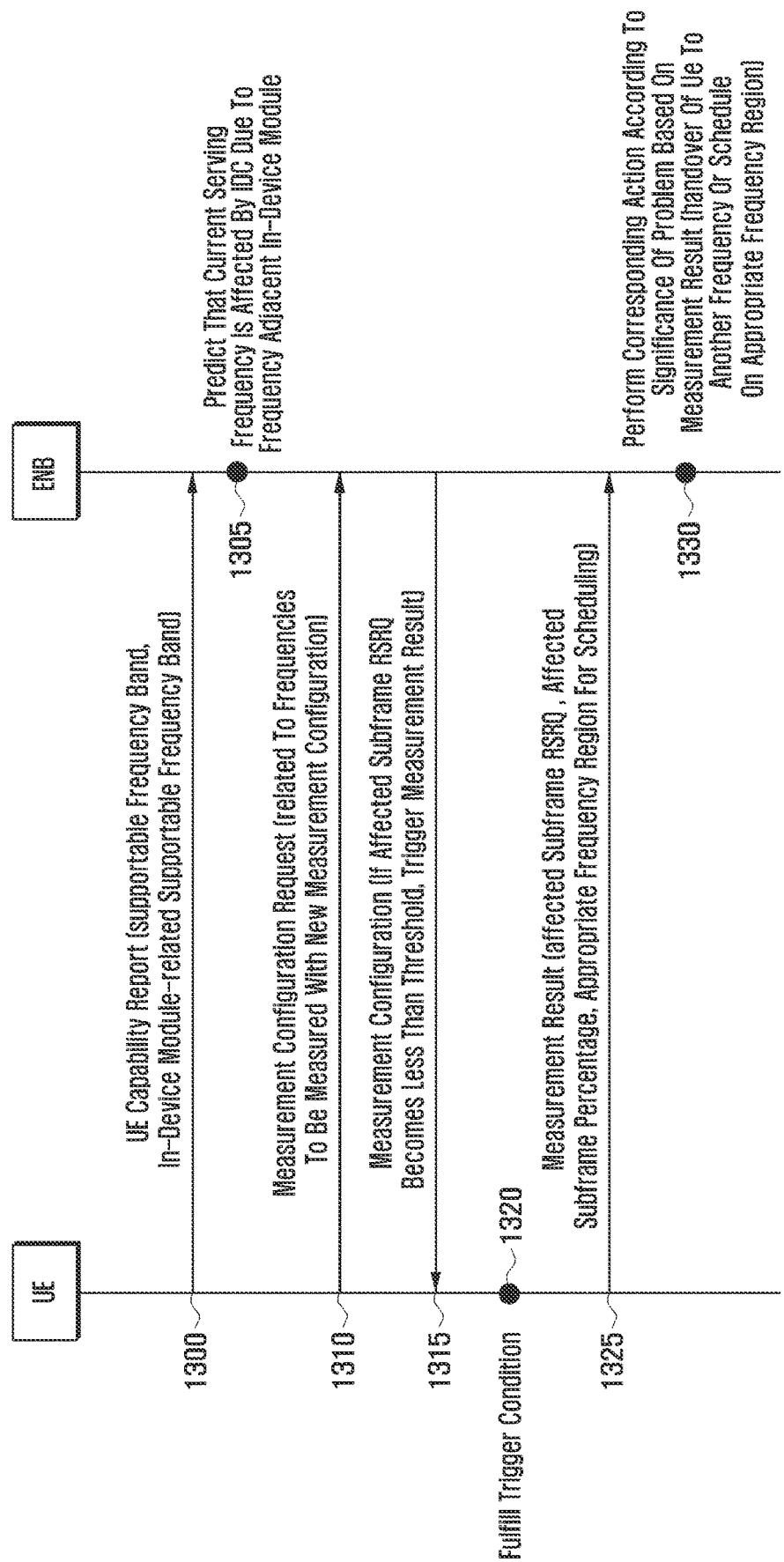
FIG. 13 shows an operation of triggering Measurement Report (MR) when RSRQ of affected subframe of a serving cell becomes equal to or less than a predetermined threshold due to IDC.
Figure 14:
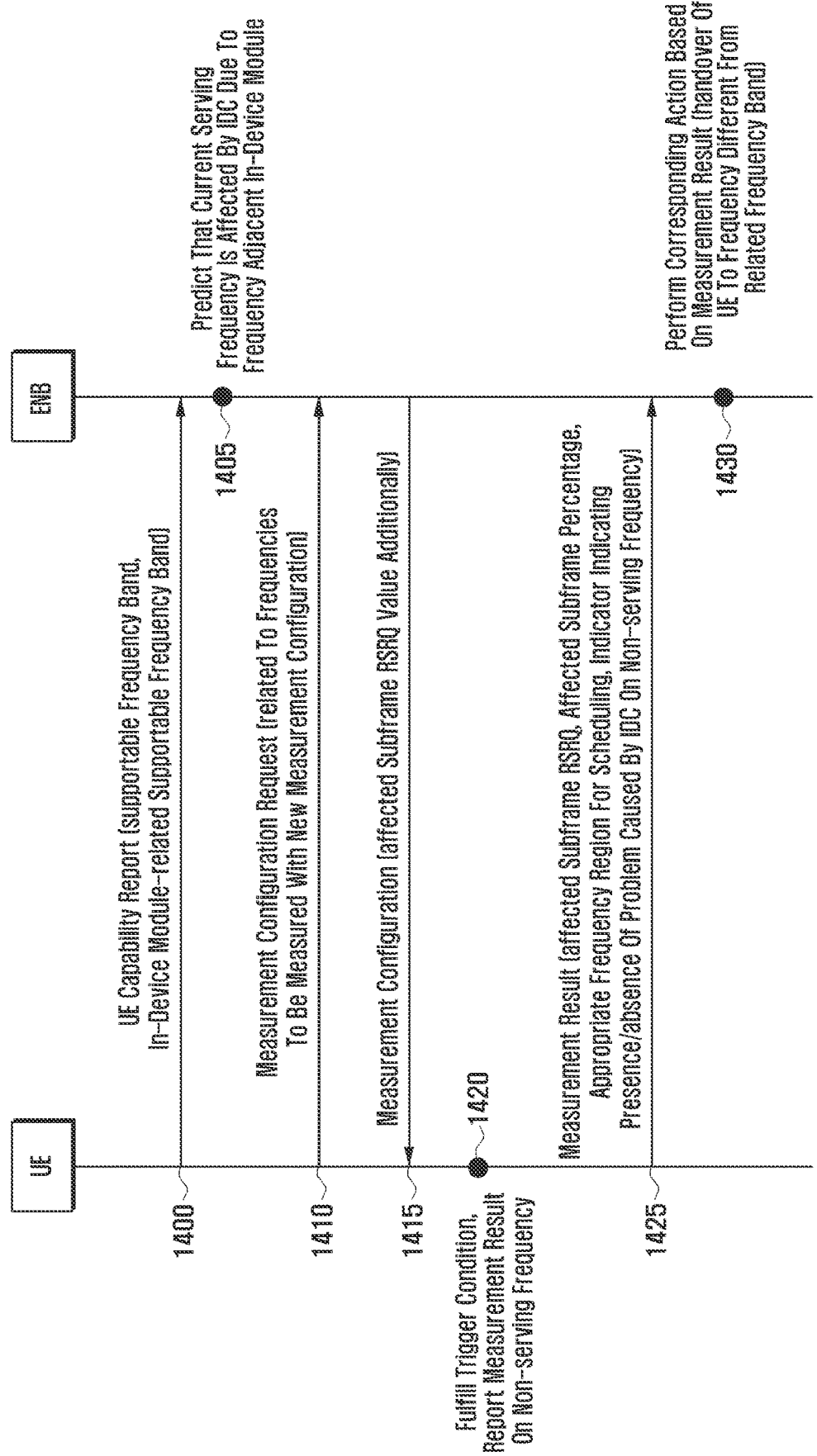
FIG. 14 is drawing illustrating the operation of reporting measurement result of base cell of non-serving frequency.
Figure 15:
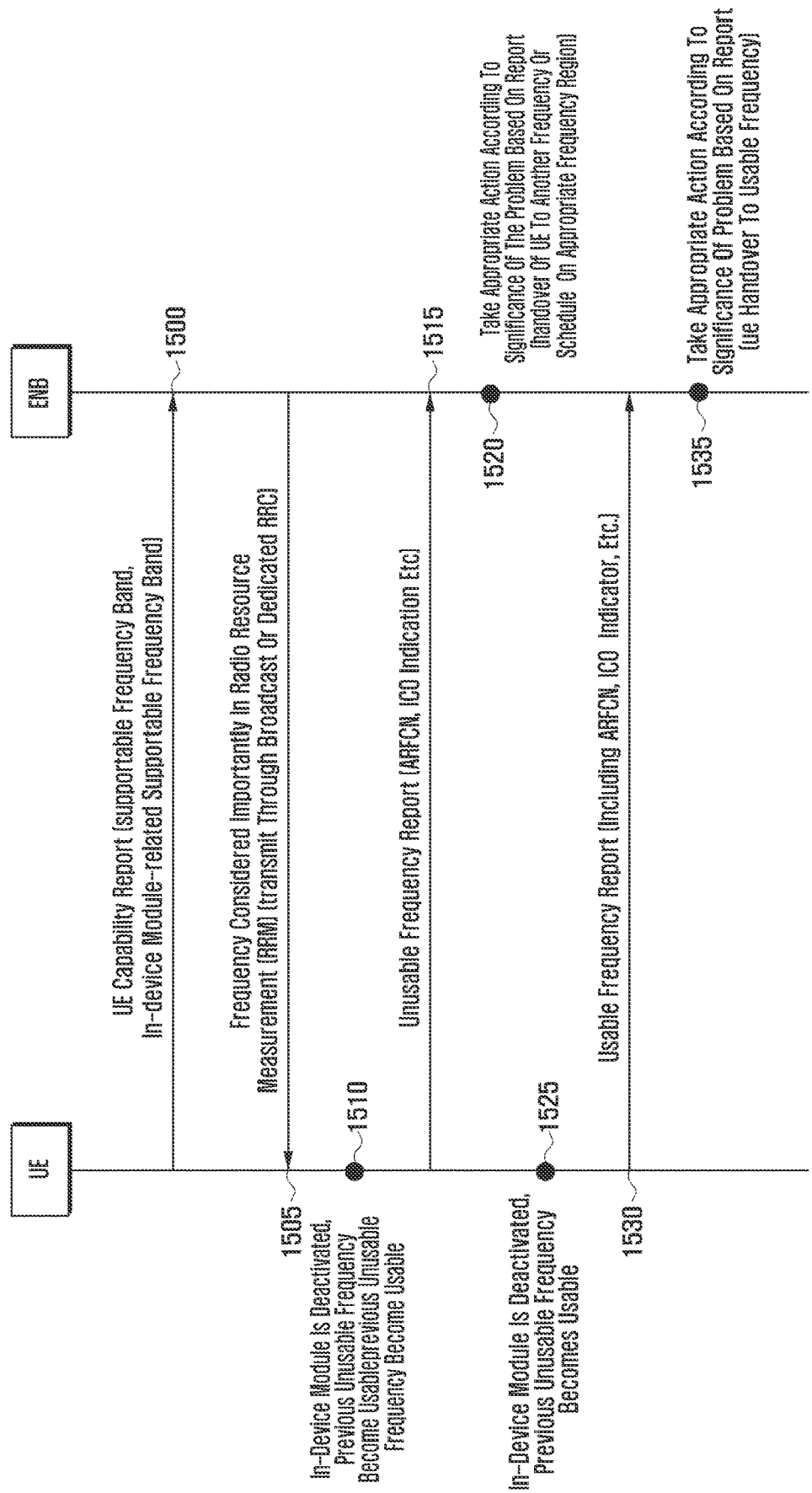
FIG. 15 is a drawing illustrating the operation of reporting state change only for eNB-indicated frequencies (RRM interested frequencies).

Absolute Radio Frequency Channel Number (ARFCN) value of the state-changed frequency. ARFCN is defined as the value indicating the carrier frequency and specified in the 3GPP LTE TS36.101.

measurement result on the above frequency indicator indicating whether there is any problem caused by IDC FIGS. 13, 14, and 15 are drawings for explaining the above-defined measurement operation.

FIG. 13 shows the Measurement Report (MR) is triggered when the RSRQ of the affected subframe of the serving cell becomes equal to or less than a predetermined threshold due to the IDC.

If the UE powers on or the UE capability changes, the UE reports its current UE capability to the NW. The UE capability is relayed to the MME and then delivered to the serving eNB. The UE capability includes the following information.

supported LTE frequency band list

LTE frequency band related to In-Device module

If the UE has the Bluetooth, WLAN, and GNSS modules, it reports a list of the LTE frequency bands that may be affected by interference among the modules.

The degree of such interference is determined based on various factors such as frequency distance between LTE band and In-Device band and UE filtering capability between the LTE signal and In-Device signal.

The eNB or the UE predicts that the current serving frequency of the UE may be affected by IDC at operation 1305. It is impossible to check the influence of the IDC with the convention LTE measurement. In this embodiment, new LTE measurement for reporting the information necessary for predicting the influence of IDC to the eNB is defined. The MR includes the following informations.

Layer 3 filtered RSRQ measured at the subframe affected by IDC

Percentage of subframe affected by IDC. For example, If 10 of 100 subframes are affected by IDC, this information indicates 10%.

The frequency band which is less affected by IDC. This information is useful when the eNB performs scheduling on the frequency on which the eNB is not affected by IDC. This information is useful especially when the UE performs handover to the frequency which is not affected by IDC.

List of frequency bands having no problem caused by IDC. This information is used when the UE performs handover to a frequency which is not affected by IDC.

The UE requests the eNB for new LTE measurement proposed in this embodiment at operation 1310. Operation 1310 is optional such that the eNB may checks the necessity in advance and request for new LTE measurement. The related RRC message includes the following informations.

List of LTE frequency bands on which new LTE measurement is required.

The eNB configures the newly defined measurement to the UE using the RRC connection reconfiguration message at operation 1315. This message includes the RSRQ threshold for used in triggering MR.

The UE determines whether the condition for triggering MR is fulfilled at operation 1320. If the layer3 filtered RSRQ value of the affected subframe becomes less than a predetermined threshold value, the MR condition is fulfilled.

The UE sends the eNB the MR along with the following informations at operation 1325.

Layer 3 filtered RSRQ, percentage of subframes affected by IDC, frequency region less affected by IDC, and list of frequency bands having no problem caused by IDC as described at operation 1305.

In addition, RSRP or RSRQ on the frequency band having no problem caused by IDC.

The eNB determines the relative importance of the problem caused by IDC at operation 1330. If the RSRQ is so low that there is no problem, the eNB performs an operation of moving the UE to another frequency.

FIG. 14 is a drawing illustrating the operation of reporting measurement result of the best cell of the non-serving frequency.

Operation 1400 is identical with operation 1300.

The eNB or the UE predicts that the UE's current serving frequency is to be affected by IDC at operation 1405. Measurement is configured to the LTE frequency affected by IDC. Also, it is necessary to configure the measurement to the LTE frequency that may be candidate for inter-frequency handover. This is to avoid handover to the frequency affected by IDC. However, it is preferred to trigger MR for non-serving frequency affected by the influence of the IDC manually to reduce unnecessary signaling overhead. Accordingly, if an MR for non-serving frequency is triggered for other reasons, it is preferred to transmit the IDC-related information too. The MR includes following informations.

Option 1

Layer 3 filtered RSRQ measured at the subframe affected by IDC

Percentage of subframes affected by IDC. For example, 10 of 100 subframes are affected by IDC, the corresponding information indicates 10%.

Option 2

Indicator indicating whether the non-serving frequency has any problem caused by IDC Operation 1410 is identical with operation 1310.

The eNB sends the UE the RRC Connection Reconfiguration message for configuring new LTE measurement at operation 1415. This message includes the indicator indicating whether to trigger MR according to RSRQ at the subframe affected by IDC. If MR is not triggered by the RSRQ of the subframe affected by IDC, the LTE measurement may be triggered only by the conventional MR trigger condition.

The MR is triggered according to a predetermined trigger condition at operation 1420.

The UE sends the eNB the MR including the following informations at operation 1425.

Conventional measurement result on the non-serving frequency

RSRP or RSRQ in N best cells on the frequency

In addition, measurement result related to IDC on the frequency

Layer 3 filtered RSRQ measured on sub-frame affected by IDC

Percentage of subframes affected by IDC. For example, if 10 of 100 subframes are affected by IDC, the corresponding information indicates 10%.

Indicator indicating whether the non-serving frequency has a problem caused by IDC.

The eNB judges the relative importance of the problem caused by IDC. If the RSRQ value is too low to cause problems, the eNB may perform an operation of moving the UE to another frequency.

FIG. 15 is a drawing illustrating the operation of reporting state change on the frequencies indicated by the eNB (RRM interested frequencies).

Operation 1500 is identical with operation 1300.

The eNB notifies the UE of the frequencies considered important in Radio Resource Management (RRM) using a broadcast or dedicated RRC message. These frequencies are regarded as RRM interested frequencies. Particularly, the frequencies adjacent to the frequency band for use in WLAN and Bluetooth may be classified into the RRM interested frequencies and, in order to use the corresponding frequencies, it is necessary to inspect the influence of the IDC.

The In-Device module of the UE operates such that some frequencies become inappropriate to use due to the IDC interference at operation 1510. Such frequencies are classified into the unusable frequencies. If the UE operates on the unusable frequency undergoing significant interference, the signals from the neighbor cells as well as the current cell are distorted. In contrast, the usable frequency has no or tiny IDC interference so as to be regarded as the frequency appropriate for LTE communication.

The UE reports unusable frequencies to the eNB at operation 1515. The related message includes the following informations.

Absolute Radio Frequency Channel Number (ARFCN) value of the frequency having change in state. If the frequency is changed from usable to unusable state, the ARFCN indicates unusable frequency and, otherwise from unusable to usable, the ARFCN indicates usable frequency.

measurement result of the frequency

Indicator indicating whether there is any problem caused by IDC.

If the indicator is included, the In-Device module type and operation frequency information is included.

The eNB performs an appropriate operation excluding the frequency from candidate handover target frequencies at operation 1520.

The UE's In-Device module stops operation such that the neighbor LTE frequencies are to be used.

The UE sends the eNB a report to notify that the frequency is became to be sued again at operation 1530.

The eNB performs an appropriate operation regarding the frequency as the handover target frequency at operation 1535.

Figure 16:
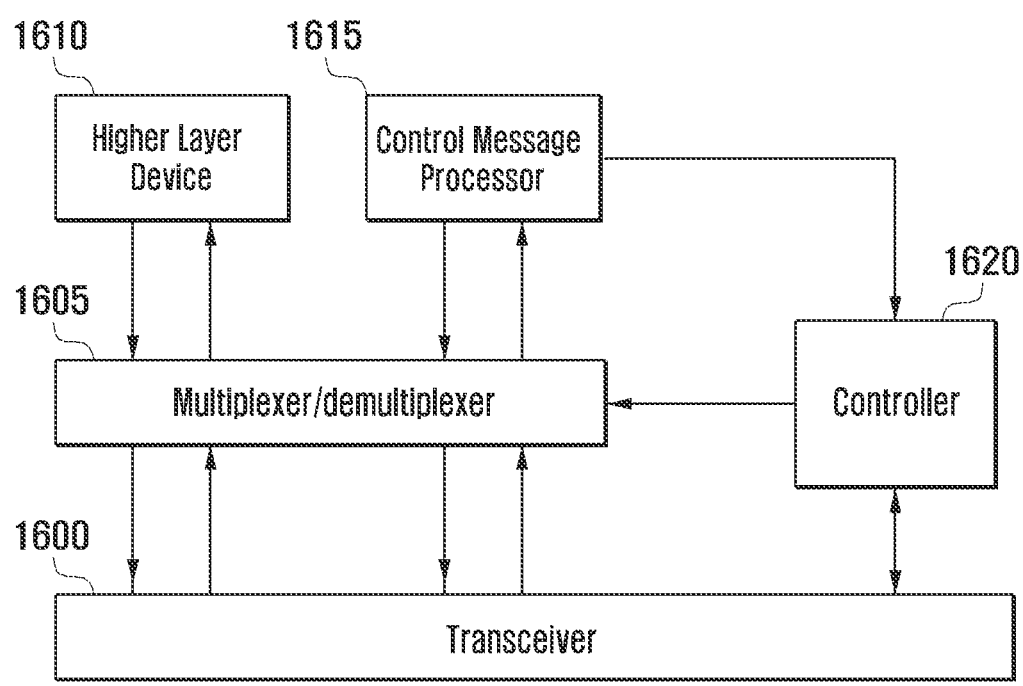
FIG. 16 is a block diagram illustrating a configuration of the UE.

FIG. 16 is a block diagram illustrating a configuration of the UE to which the present invention is applied.

The UE communicates data with higher layer 1610 and the control message processor 1615 with the control message processor 1615. When transmitting a control signal or data to the eNB, the UE multiplexes the data by means of the multiplexer 1605 and transmits the data by means of the transceiver 1600 under the control of the control unit 1620. When receiving a signal, the UE receives a physical signal by means of the transceiver 1600, demultiplexes the received signal by means of the multiplexer/demultiplexer 1605, and delivers the message information to the higher layer 1610 or the control message processor 1615 under the control of the control unit 1620.

The invention claimed is:

1. A method performed by a terminal in a wireless communication system, the method comprising:

detecting a radio link failure (RLF);

receiving, from a base station, a user equipment (UE) information request message; and transmitting, to the base station, a UE information response message as a response to the UE information request message, the UE information response message including first time information associated with the RLF, second time information associated with the RLF, a physical cell identity of a primary cell where the RLF is detected, and third information for identifying a carrier frequency of the primary cell, wherein the first time information associated with the RLF includes time elapsed since a last RLF and the second time information associated with the RLF includes time elapsed since a last handover initialization until the RLF, wherein the UE information response message including fourth information indicating that a log measurement report of a neighboring cell is affected by in-device coexistence (IDC) is transmitted via a signaling radio bearer (SRB) 2 in case that the log measurement report is included in the UE information response message, wherein the UE information response message is transmitted via an SRB 1 in case that the log measurement report is not included in the UE information response message, wherein the SRB 1 is used for a special case non-access stratum (NAS) message and a radio resource control (RRC) message using a dedicated control channel (DCCH) logical channel, wherein the SRB 2 is used for a NAS message and an RRC message including the log measurement report, and wherein the SRB 2 has a lower priority than the SRB 1.

2. The method of claim 1, wherein the UE information response message includes a cause of the RLF, and wherein the cause of the RLF includes at least one of a timer expiry and a random access problem.

3. The method of claim 1, wherein the UE information request message includes a first indicator to request a report on the RLF.

4. The method of claim 1, further comprising:

transmitting, to the base station, a second indicator associated with the RLF, in case that the terminal has information on the RLF.

5. The method of claim 1, wherein the fourth information is included in the UE information response message in case that the log measurement report of the neighboring cell is affected by the IDC and measurement result of a serving cell is logged.

6. A method performed by a base station in a wireless communication system, the method comprising:

transmitting, to a terminal, a user equipment (UE) information request message; and receiving, from the terminal, UE information response message as a response to the UE in request message, the UE information response message including first time information associated with a radio link failure (RLF), second time information associated with the RLF, a physical cell identity of a primary cell where an RLF is detected, and third information for identifying a carrier frequency of the primary cell, wherein the first time information associated with the RLF includes time elapsed since a last RLF and the second time information associated with the RLF includes time elapsed since a last handover initialization until the RLF, wherein the UE information response message including fourth information indicating that a log measurement report of a neighboring cell is affected by in-device coexistence (IDC) is transmitted via a signaling radio bearer (SRB) 2 in case that the log measurement report is included in the UE information response message, wherein the UE information response message is transmitted via an SRB 1 in case that the log measurement report is not included in the UE information response message, wherein the SRB 1 is used for a special case non-access stratum (NAS) message and a radio resource control (RRC) message using a dedicated control channel (DCCH) logical channel, wherein the SRB 2 is used for a NAS message and an RRC message including the log measurement report, and wherein the SRB 2 has a lower priority than the SRB 1.

7. The method of claim 6,
wherein the UE information response message includes a cause of the RLF, and
wherein the cause of the RLF includes at least one of a timer expiry and a random access problem.

8. The method of claim 6, wherein the UE information request message includes a first indicator to request a report on the RLF.

9. The method of claim 6, further comprising:
receiving, from the terminal, a second indicator associated with the RLF, in case that the terminal has information on the RLF.

10. A terminal in a wireless communication system, the terminal comprising:
a transceiver; and
a controller configured to:
detect a radio link failure (RLF),
receive, from a base station via the transceiver, a user equipment (UE) information request message, and
transmit, to the base station via the transceiver, a UE information response message as a response to the UE formation request message, the UE information response message including first time information associated with the RLF, second time information associated with the RLF, a physical cell identity of a primary cell where the RLF is detected, and third information for identifying a carrier frequency of the primary cell, wherein the first time information associated with the RLF includes time elapsed since a last RLF and the second time information associated with the RLF includes time elapsed since a last handover initialization until the RLF, wherein the UE information response message including fourth information indicating that a log measurement report of a neighboring cell is affected by in-device coexistence (IDC) is transmitted via a signaling radio bearer (SRB) 2 in case that the log measurement report is included in the UE information response message, wherein the UE information response message is transmitted via an SRB 1 in case that the log measurement report is not included in the UE information response message, wherein the SRB 1 is used for a special case non-access stratum (NAS) message and a radio resource control (RRC) message using a dedicated control channel (DCCH) logical channel, wherein the SRB 2 is used for a NAS message and an RRC message including the log measurement report, and wherein the SRB 2 has a lower priority than the SRB 1.

11. The terminal of claim 10,
wherein the UE information response message includes a cause of the RLF, and
wherein the cause of the RLF includes at least one of a timer expiry and a random access problem.

12. The terminal of claim 10, wherein the UE information request message includes a first indicator to request a report on the RLF.

13. The terminal of claim 10, wherein the controller is further configured to transmit, to the base station, a second indicator associated with the RLF, in case that the terminal has information on the RLF.

14. A base station in a wireless communication system, the base station comprising:
a transceiver; and
a controller configured to:
transmit, to a terminal via the transceiver, a user equipment (UE) information request message, and
receive, from the terminal via the transceiver, a UE information response message as a response to the UE information request message, the UE information response message including first time information associated with a radio link failure (RLF), second time information associated with the RLF, a physical cell identity of a primary cell where an RLF is detected, and third information for identifying a carrier frequency of the primary cell, wherein the first time information associated with the RLF includes time elapsed since a last RLF and the second time information associated with the RLF includes time elapsed since a last handover initialization until the RLF, wherein the UE information response message including fourth information indicating that a log measurement report of a neighboring cell is affected by in-device coexistence (IDC) is transmitted via a signaling radio bearer (SRB) 2 in case that the log measurement report is included in the UE information response message, wherein the UE information response message is transmitted via an SRB 1 in case that the log measurement report is not included in the UE information response message, wherein the SRB 1 is used for a special case non-access stratum (NAS) message and a radio resource control (RRC) message using a dedicated control channel (DCCH) logical channel, wherein the SRB 2 is used for a NAS message and an RRC message including the log measurement report, and wherein the SRB 2 has a lower priority than the SRB 1.

15. The base station of claim 14,
wherein the UE information response message includes a cause of the RLF, and
wherein the cause of the RLF includes at least one of a timer expiry and a random access problem.

16. The base station of claim 14, wherein the UE information request message includes a first indicator to request a report on the RLF.

17. The base station of claim 14, the controller is further configured to receive, from the terminal, a second indicator associated with the RLF, in case that the terminal has information on the RLF.

\* \* \* \* \*